US011934140B2

(12) United States Patent
Yamaoka et al.

(10) Patent No.: US 11,934,140 B2
(45) Date of Patent: Mar. 19, 2024

(54) DEVELOPER SUPPLY CONTAINER AND DEVELOPER SUPPLYING SYSTEM

(71) Applicant: CANON KABUSHIKI KAISHA, Tokyo (JP)

(72) Inventors: Masato Yamaoka, Kashiwa (JP); Toshiaki Nagashima, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/903,350

(22) Filed: Sep. 6, 2022

(65) Prior Publication Data

US 2022/0413431 A1 Dec. 29, 2022

Related U.S. Application Data

(60) Division of application No. 17/368,950, filed on Jul. 7, 2021, now Pat. No. 11,474,474, which is a division
(Continued)

(30) Foreign Application Priority Data

Sep. 21, 2017 (JP) ................................. 2017-181797

(51) Int. Cl.
*G03G 15/08* (2006.01)
*G03G 21/16* (2006.01)

(52) U.S. Cl.
CPC ..... *G03G 21/1647* (2013.01); *G03G 15/0867* (2013.01); *G03G 15/0872* (2013.01); *G03G 21/1676* (2013.01)

(58) Field of Classification Search
CPC ........... G03G 15/0867; G03G 15/0872; G03G 15/0886; G03G 21/1647; G03G 21/1676;
(Continued)

(56) References Cited

U.S. PATENT DOCUMENTS 4,931,838 A 6/1990 Ban et al.
5,381,217 A 1/1995 Ishida
(Continued)

FOREIGN PATENT DOCUMENTS

CN 101080678 A 11/2007
CN 103365161 A 10/2013
(Continued)

OTHER PUBLICATIONS

International Search Report and Written Opinion for International Patent Application No. PCT/JP2018/036619, dated Nov. 13, 2018.
(Continued)

*Primary Examiner* — Sophia S Chen
(74) *Attorney, Agent, or Firm* — Venable LLP

(57) ABSTRACT

A developer supply container includes a rotatable developer accommodating portion accommodating developer and a developer discharging portion in fluid communication with the developer accommodating portion, the developer discharging portion being provided with a discharge opening for discharging the developer from the developer accommodating portion. A seesaw member is provided at each of opposite lateral sides of the developer supply container, each seesaw member being positioned to not cover the discharge opening when the developer supply container is oriented with the developer discharge opening positioned at a bottom side of the developer discharging portion, with both of the seesaw members being rotatable about a second rotational axis that extends in a direction that crosses a direction of the first rotational axis.

10 Claims, 16 Drawing Sheets

Related U.S. Application Data of application No. 16/862,675, filed on Apr. 30, 2020, now Pat. No. 11,099,519, which is a division of application No. 16/353,177, filed on Mar. 14, 2019, now Pat. No. 10,761,474, which is a continuation of application No. PCT/JP2018/036619, filed on Sep. 21, 2018.

(58) Field of Classification Search
CPC . G03G 15/08; G03G 21/16; G03G 2215/0665
See application file for complete search history.

(56) References Cited

U.S. PATENT DOCUMENTS

| | | | |
|---|---|---|---|
| 5,491,542 | A | 2/1996 | Nagashima et al. |
| 5,778,282 | A | 7/1998 | Nagashima et al. |
| 5,784,665 | A | 7/1998 | Bae |
| 6,118,957 | A | 9/2000 | Fujiwara et al. |
| 6,118,958 | A | 9/2000 | Nagashima et al. |
| 6,178,302 | B1 | 1/2001 | Nagashima et al. |
| 6,219,506 | B1 | 4/2001 | Morinage et al. |
| 6,501,924 | B2 | 12/2002 | Nagashima et al. |
| 6,909,865 | B2 | 6/2005 | Nagashima et al. |
| 6,978,107 | B2 | 12/2005 | Nagashima et al. |
| 7,897,303 | B2 | 3/2011 | Rudin et al. |
| 9,229,364 | B2 | 1/2016 | Murakami et al. |
| 9,354,549 | B1 | 5/2016 | Okino et al. |
| 9,383,681 | B2 | 7/2016 | Takagi et al. |
| 9,696,684 | B2 | 6/2017 | Maeshima et al. |
| 9,720,349 | B2 | 8/2017 | Yamaoka et al. |
| 10,088,773 | B2 | 10/2018 | Yamaoka et al. |
| 10,761,474 | B2 | 9/2020 | Yamaoka et al. |
| 2007/0223970 | A1 | 9/2007 | Kawai |
| 2007/0280743 | A1 | 12/2007 | Nakajima et al. |
| 2009/0185824 | A1 | 7/2009 | Murakami et al. |
| 2011/0064461 | A1 | 3/2011 | Ishii et al. |
| 2011/0123232 | A1 | 5/2011 | Takashima et al. |
| 2013/0259534 | A1 | 10/2013 | Maeshima |
| 2013/0272750 | A1 | 10/2013 | Matsumoto et al. |
| 2014/0153974 | A1 | 6/2014 | Jimba et al. |
| 2014/0169836 | A1 | 6/2014 | Nagashima et al. |
| 2015/0043944 | A1 | 2/2015 | Yamamoto |
| 2015/0248102 | A1 | 9/2015 | Nakajima |
| 2016/0004186 | A1 | 1/2016 | Jimba et al. |
| 2016/0154375 | A1 | 6/2016 | Kamizato et al. |
| 2017/0176891 | A1 | 6/2017 | Chuang et al. |
| 2017/0242367 | A1 | 8/2017 | Jimba et al. |
| 2017/0261926 | A1 | 9/2017 | Kashiide et al. |
| 2017/0285529 | A1 | 10/2017 | Nishiyama |
| 2019/0018340 | A1 | 1/2019 | Yamaoka et al. |
| 2019/0018341 | A1 | 1/2019 | Yamaoka et al. |
| 2019/0204777 | A1 | 7/2019 | Yamaoka et al. |
| 2019/0212672 | A1 | 7/2019 | Gamo et al. |
| 2019/0212693 | A1 | 7/2019 | Okino et al. |

FOREIGN PATENT DOCUMENTS

| | | | |
|---|---|---|---|
| CN | 103733141 | A | 4/2014 |
| CN | 105103056 | A | 11/2015 |
| CN | 105103056 | A | 8/2017 |
| CN | 107111265 | A | 8/2017 |
| DE | 10 2006 061 874 | A1 | 9/2007 |
| EP | 2 624 069 | A | 8/2013 |
| EP | 2 428 851 | B1 | 10/2014 |
| EP | 3 081 991 | A | 10/2016 |
| JP | H04-68372 | A | 3/1992 |
| JP | 2001-222158 | A | 8/2001 |
| JP | 2013-015826 | A | 1/2013 |
| JP | 2016-102987 | A | 6/2016 |
| KR | 10-1998-0010598 | A | 4/1998 |
| KR | 10-2007-0027133 | A | 3/2007 |
| KR | 10-2010-0132083 | A | 12/2010 |
| KR | 10-2014-0041599 | A | 4/2014 |
| KR | 102359671 | B1 | 3/2022 |
| RU | 2 419 120 | C2 | 5/2011 |
| RU | 2 593 686 | C2 | 8/2016 |
| RU | 2 597 669 | C1 | 9/2016 |
| RU | 2 628 667 | C2 | 8/2017 |
| WO | 2013/031996 | A | 3/2013 |

OTHER PUBLICATIONS

Jan. 4, 2021 Office Action in Korean Patent Application Pub. No. 10-2020-7010440.
Oct. 14, 2020 Decision to Grant in Russian Patent Application No. 2020113692 (with English translation).
May 18, 2021 Extended Search Report in European Patent Application No. 18 859 759.5.
May 31, 2021 Office Action in Russian Patent Application No. 2020141077 (with English translation).
Aug. 9, 2021 Office Action in German Patent Applicaiton No. 11 2018 004 233.2 (with English translation).
Sep. 8, 2021 and Sep. 21, 2021 Office Action in Eurasian Patent Application No. 202190564 (with English translations).
Nov. 1, 2021 Notice of Allowance in Korean Patent Application No. 10-2020-7010440.
Jan. 19, 2022 Office Action in Chinese Patent Application No. 201880060152.7 (with English translation).
Jan. 19, 2022 Office Action in Chinese Patent Application No. 201880060152.7.
Mar. 16, 2022 Office Action in Korean Patent Application No. 10-2022-7003654.
Aug. 15, 2022 Examination Report in Australian Patent Application No. 2021212033.
Jun. 29, 2021 Office Action in Japanese Patent Application No. 2017-181797 (with machine translation).
Jul. 25, 2023 Notice of Acceptance in Korean Patent Application Pub. No. 10-2022-7003654.
Dec. 6, 2023 Notice of Allowance in Korean Patent Application No. 10-2023-7036745 (with English translation).

(a)

(b)

(a)

(b)

(c)

(a)

(b)

(a)

(b)

(a)

(b)

(a)

(b)

(a)

(b)

(a)

(b)

(a)

(b)

DEVELOPER SUPPLY CONTAINER AND DEVELOPER SUPPLYING SYSTEM

TECHNICAL FIELD

The present invention relates to a developer supply container dismountably mountable to a developer receiving apparatus and a developer supplying system.

BACKGROUND ART

Conventionally, in electrophotographic image forming apparatuses such as copying machines, fine developing powder such as toner has been used. In such an image forming apparatus, the developer consumed by the image formation is supplemented from a developer supply container.

For example, a structure has been proposed in which the developer supply container is mountable to and dismountable from a developer receiving apparatus provided in the image forming apparatus, and the developer receiving portion of the developer receiving apparatus is displaced toward the discharge opening of the developer supply container in accordance with the mounting operation of the developer supply container (JP2013-015826A).

SUMMARY OF THE INVENTION

Problems to be Solved by the Invention

An object of the present invention is to provide a developer supply container and a developer supplying system capable of improving easiness of operation by reducing the operation force when mounting the developer supply container.

Means for Solving the Problem

According to an aspect of the present invention, there is provided a developer supply container detachably mountable to a developer receiving apparatus, the developer receiving apparatus including a receiving opening for receiving a developer, and a portion-to-be-engaged integrally displaceable with the developer receiving portion, said developer supply container comprising a rotatable developer accommodating portion accommodating the developer; a gear for transmitting a driving force to said developer accommodating portion; a developer discharging portion rotatable relative to said developer accommodating portion and provided at a bottom side with a discharge opening for discharging the developer from said developer accommodating portion; a rotatable engaging portion engageable with the portion-to-be-engaged with a mounting operation of said developer supply container to displace the developer receiving portion so as to move the receiving opening toward said discharge opening, thus bring the receiving opening in fluid communication with said discharge opening; a shaft portion which is provided between one end portion of said engaging portion and other end portion thereof with respect to a rotational axis direction of said developer accommodating portion and which rotatably supports said engageable member; and a restricting portion for restricting movement of a gear side end portion of said engaging portion with respect to the rotational axis direction beyond a predetermined position.

Effect of the Invention

According to the present invention, it is possible to improve the cooperativity by reducing the operating force when mounting the developer supply container.

DESCRIPTION OF THE EMBODIMENTS

In the following, referring to part (b) of FIGS. 1 to 16, an embodiment of the present invention will be described. First, referring to FIG. 1 and FIG. 2, the schematic structure of the image forming apparatus of the embodiment will be described.

[Image Forming Apparatus]

Figure 1:
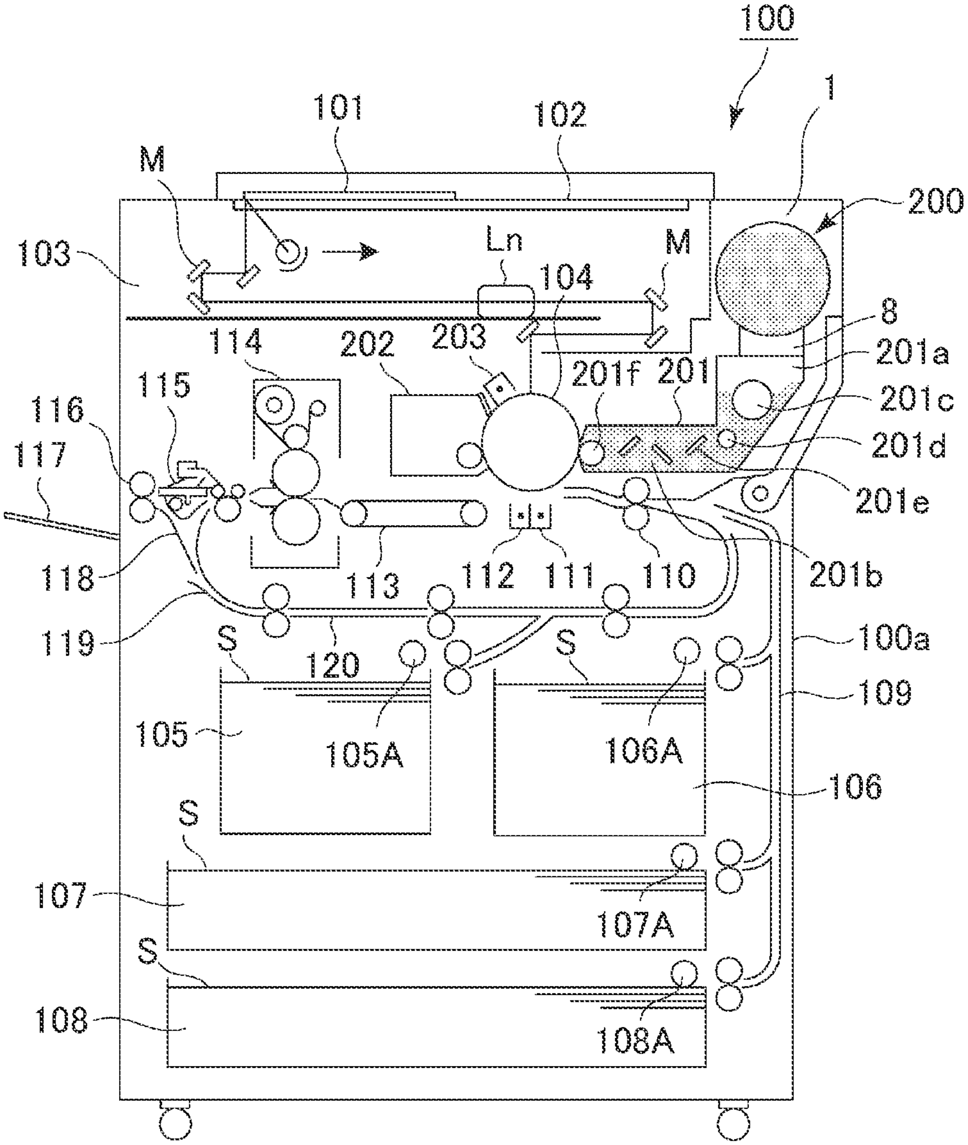
FIG. 1 is a schematic structure illustration of an image forming apparatus according to an embodiment of the present invention.

In FIG. 1, the image forming apparatus 100 includes an original reading device 103 at a top of a main assembly 100*a* of the image forming apparatus. An original 101 is placed on an original platen glass 102. A light image corresponding to image information of the original 101 is imaged, using a plurality of mirrors M and the lens Ln of the original reading device 103, on a photosensitive drum 104 which is a cylindrical photosensitive member as an image bearing member to form an electrostatic latent image. This electrostatic latent image is visualized using toner (one component magnetic toner) as a developer (dry powder) by a dry type developing device (one-component developing device) 201. Here, in this embodiment, a one-component magnetic toner is used as the developer to be supplied from the developer supply container 1 (also referred to as a toner cartridge), but the present invention is not limited to such an example, and it may be of a structure as will be described hereinafter.

More specifically, in the case of using a one-component developing device which performs developing operation with one component nonmagnetic toner, one component nonmagnetic toner is supplied as a developer. In addition, non-magnetic toner is supplied as the developer when using a two-component developer which develops the image using a two component developer prepared by mixing magnetic carrier and nonmagnetic toner. In this case, as the developer, a structure may be employed in which the magnetic carrier is also supplied together with the non-magnetic toner.

As described above, a developing device 201 shown in FIG. 1 develops the electrostatic latent image formed on the photosensitive drum 104 using the toner as the developer based on the image information of the original 101. In addition, a developer supplying system 200 is connected to developing device 201, and the developer supplying system 200 includes a developer supply container 1 and a developer receiving apparatus 8 relative to which the developer supply container 1 is mountable and dismountable. Developer supplying system 200 will be described hereinafter.

The developing device 201 includes a developer hopper portion 201*a* and a developing roller 201*f*. In this developer hopper portion 201*a*, a stirring member 201*c* for stirring the developer supplied from the developer supply container 1 is provided. The developer stirred by the stirring member 201*c* is fed to a feeding member (201*e*) side by a feeding member 201*d*. And, the developer which has been sequentially fed by the feeding members 201*e* and 201*b* is carried on the developing roller 201*f* and finally supplied to a developing zone formed with the photosensitive drum 104. In this embodiment, a single component developer is used, and therefore, the toner as the developer is supplied from the developer supply container 1 to the developing device 201. However, in the case of using a two-component developer, it is possible to supply a mixture of the toner and the carrier as the developer from the developer supply container 1.

Cassettes 105 to 108 contain recording materials S such as sheets of paper. When an image is to be formed, a cassette containing an optimum recording material S among the sheets contained in these cassettes 105 to 108 is selected on the basis of the information inputted by the operator (user) on the operation portion 100*d* (FIG. 2) of the image forming apparatus 100 or on the basis of the size of the original 101. Here, as for the recording material S, it is not limited to sheets of paper, but it may be an OHP sheet or the like as the case may be. One sheet of recording material S fed by the feeding and separating devices 105A to 108A is fed to registration rollers 110 by way of a feeding portion 109. Then, the recording material S is fed in synchronization with the rotation of the photosensitive drum 104 and the scan timing of the original reading device 103.

A transfer charging device 111 and a separation charging device 112 are provided at positions opposing the photosensitive drum 104 on a downstream side of the registration roller 110 in the recording material feeding direction. The image of the developer (toner image) formed on the photosensitive drum 104 is transferred onto the recording material S fed by the registration roller 110, by a transfer charging device 111. And, the recording material S onto which the toner image is transferred is separated from the photosensitive drum 104 by a separation charging device 112. Subsequently, heat and pressure are applied to the recording material S fed by the feeding portion 113 in a fixing portion 114, so that the toner image is fixed on the recording material. Thereafter, the recording material S to which the toner image is fixed passes through a discharge/reversing portion 115 and is discharged to the discharge tray 117 by the discharge roller 116, in case of single-sided copy.

On the other hand, in case of double-sided copy, the recording material S passes through the discharge/reversing portion 115, and the recording material S is partly discharged to the outside of the apparatus once by the discharge roller 116. After this, at the timing when a trailing end of the recording material S passes through the switching member 118 and is still nipped by the discharge rollers 116, the position of the switching member 118 is switched, and the discharge roller 116 is rotated counterclockwise, by which the recording material S is fed again into the apparatus. Thereafter, the recording material S is fed to the registration roller 110 by way of the re-feeding and feeding portions 119 and 120, and is discharged to the discharge tray 117 by way of the same path as in the case of single-sided copying.

In the image forming apparatus 100 having the above-described structure, image forming process devices such as a developing device 201, a cleaner portion 202, a primary charging device 203 and the like are provided around the photosensitive drum 104. Here, the developing device 201 supplies the developer to the electrostatic latent image formed on the photosensitive drum 104 on the basis of the image information of the original 101 read by the original reading device 103 so as to develop the electrostatic latent image. In addition, the primary charging device 203 uniformly charges the surface of the photosensitive drum to form a desired electrostatic latent image on the photosensitive drum 104. Furthermore, the cleaner portion 202 has a function of removing the developer remaining on the photosensitive drum 104.

Figure 2:
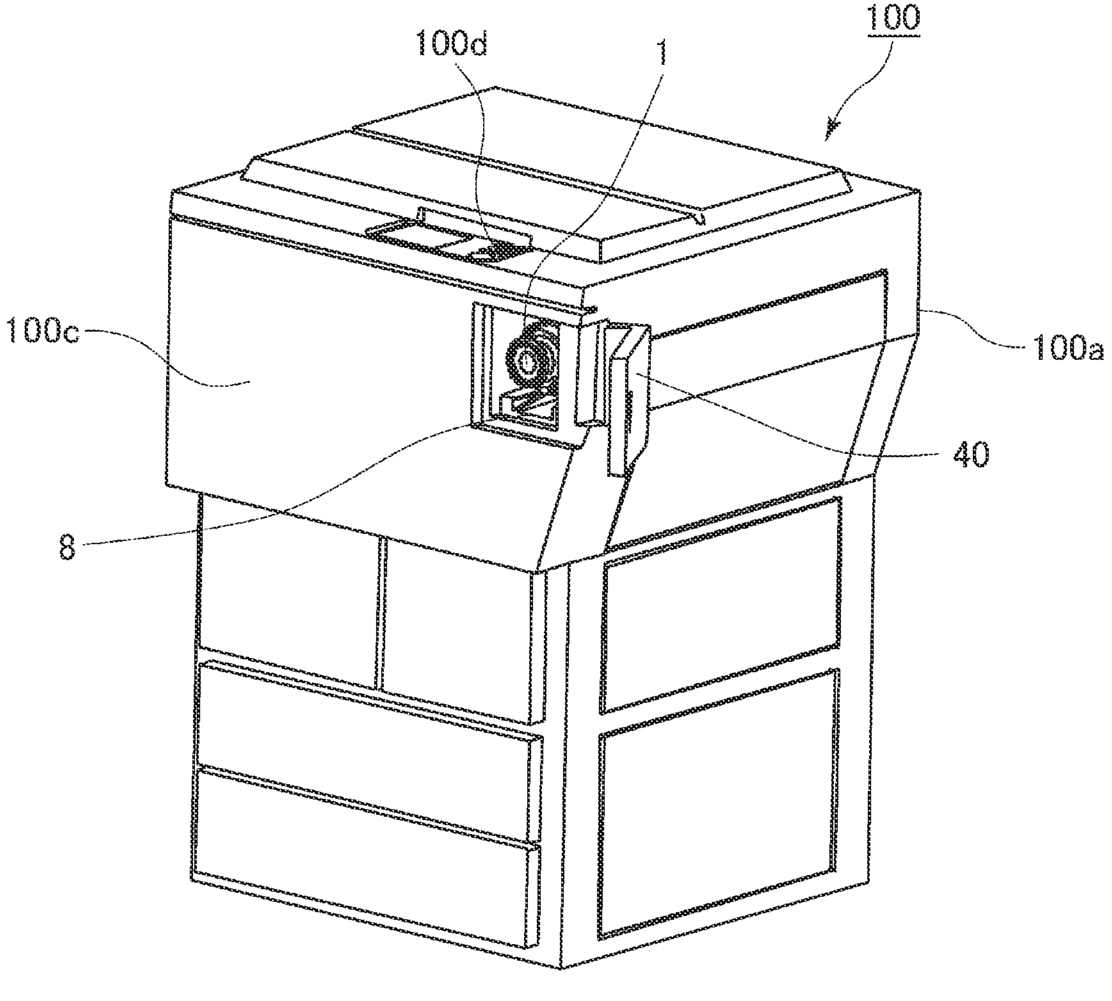
FIG. 2 is a perspective view of the image forming apparatus according to the embodiment.

As shown in FIG. 2, when the operator opens a replacement cover 40 which is a portion of an outer cover of the apparatus main assembly 100*a* of the image forming apparatus 100, a part of the developer receiving apparatus 8 which will be described hereinafter can be seen. And, by inserting the developer supply container 1 into this developer receiving apparatus 8, the developer supply container 1 is mounted in a state where it can supply the developer to the developer receiving apparatus 8. On the other hand, when the operator exchanges the developer supply container 1, it carries out the operation opposite to the loading operation, by which the developer supply container 1 is dismounted from the developer receiving apparatus 8, and thereafter a new developer supply container 1 can be mounted. Here, the replacement cover 40 is a cover exclusively for mounting/dismounting (exchanging) the developer supply container 1, and is opened and closed only for dismounting/mounting the developer supply container 1. On the other hand, the maintenance operation for the image forming apparatus 100 is performed by opening/closing a front cover 100*c*. Here, the replacement cover 40 and the front cover 100*c* may be integrated. In such a case, the replacement of the developer supply container 1 and the maintenance of the image forming apparatus 100 are performed by opening and closing the integrated cover (not shown).

[Developer Receiving Apparatus]

Next, referring to part (a) of FIG. 3 to part (c) of FIG. 4, the developer receiving apparatus 8 constituting the developer supplying system 200 will be described. As shown in part (a) of FIG. 3, the developer receiving apparatus 8 is provided with a mounting portion (mounting space) 8*f* to which the developer supply container 1 is dismountably mounted. The mounting portion 8*f* is provided with an insertion guide 8*e* for guiding the developer supply container 1 in the mounting and dismounting directions. In the case of this embodiment, the structure is such that the dismounting direction B of the developer supply container 1 is opposite to the direction A of mounting the developer supply container 1 by the insertion guide 8*e*.

Figure 3:
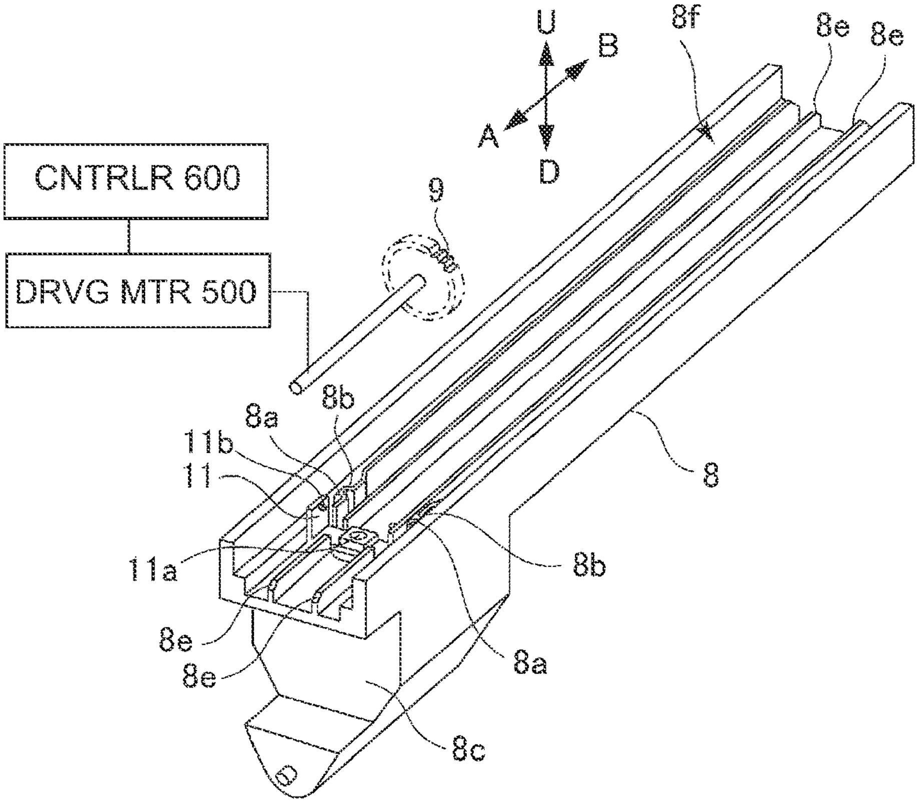
FIG. 3 illustrates a developer receiving apparatus according to the embodiment, wherein part (a) thereof is a perspective view, and part (b) is a cross-sectional view thereof.
Figure 3:
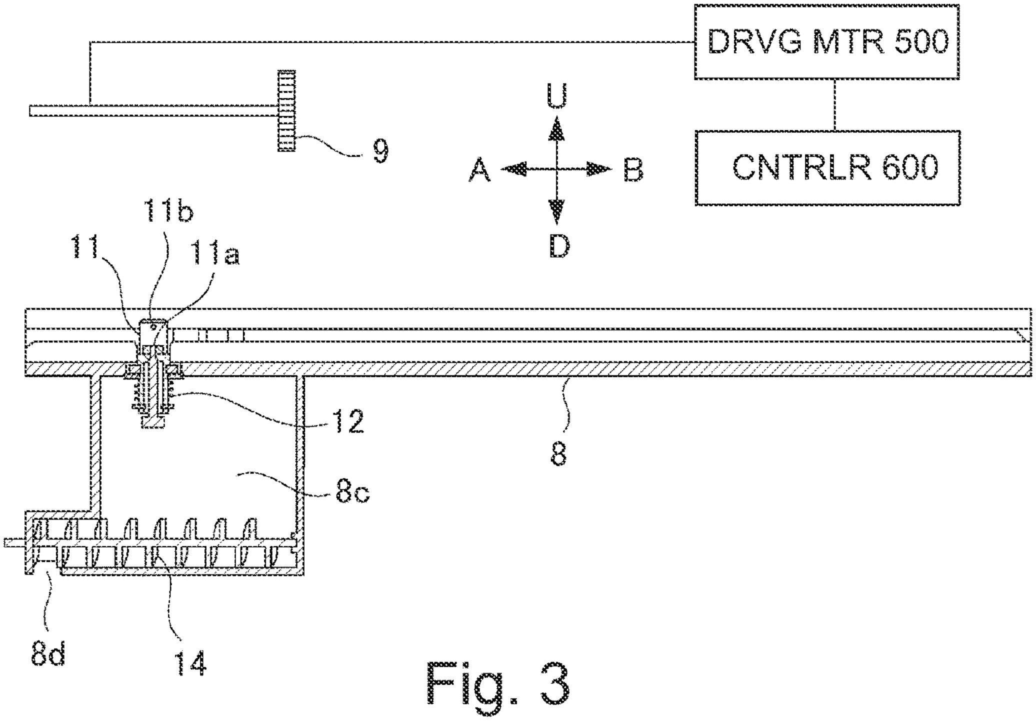
Figure 4:
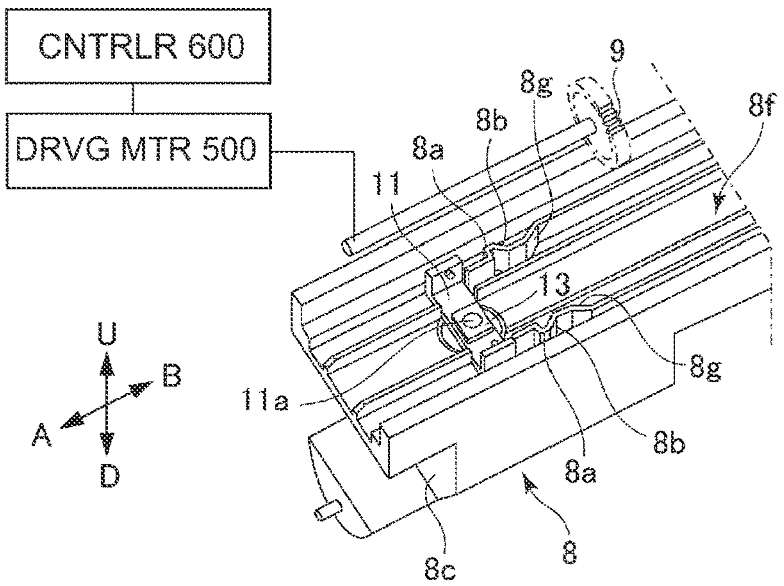
FIG. 4 illustrates the developer receiving apparatus according to the embodiment, and part (a) thereof is an enlarged perspective view, part (b) thereof is an enlarged sectional view, and part (c) is a perspective view of the developer receiving portion.
Figure 4:
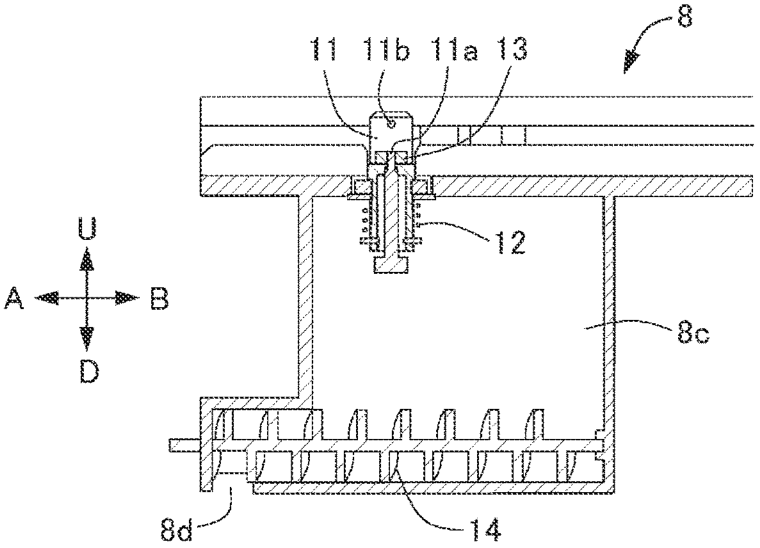
Figure 4:
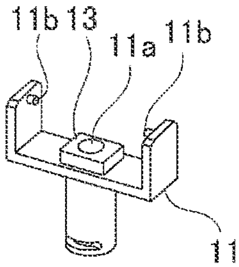

As shown in part (a) of FIG. 3 to part (a) of FIG. 4, the developer receiving apparatus 8 has a driving gear 9 which functions as a driving mechanism for driving the developer supply container 1. A rotational driving force is transmitted to the gear 9 from a driving motor 500 by way of a driving gear train (not shown), so that the gear 9 applies the rotational driving force to the developer supply container 1 mounted in the mounting portion 8*f*. The operation of the driving motor 500 is controlled by the control device 600.

In addition to controlling the driving motor 500, the control device 600 controls overall of the image forming apparatus 100. The control device 600 has a CPU (Central Processing Unit), a ROM (Read Only Memory), and a RAM (Random Access Memory). The CPU controls each portion while reading the program corresponding to a control procedure stored in the ROM. In addition, working data and an input data are stored in the RAM, and the CPU executes control while looking up the data stored in the RAM on the basis of the program etc.

In the mounting portion 8*f* of the developer receiving apparatus 8, there is provided a developer receiving portion 11 for receiving the developer discharged out of the developer supply container 1. The developer receiving portion 11 is connected to a container discharge opening 3*a*4 (part (a) of FIG. 16) of the developer supply container 1 when the developer supply container 1 is mounted, and has a receiving opening 11*a* for receiving the developer discharged through the container discharge opening 3*a*4. The developer receiving portion 11 is mounted so as to be movable (displaceable) in the direction in which the receiving opening 11*a* moves toward and away from the container discharge opening 3*a*4 (in this embodiment, the direction crossing with the direction A in which the developer supply container 1 is mounted (more specifically, vertical direction relative to the developer receiving apparatus 8)). As shown in part (b) of FIG. 3, in the case of this embodiment, the developer receiving portion 11 is urged by an urging member 12, including a helical compression coil spring, for example, in such a direction that the receiving opening 11*a* moves away from the container discharge opening 3*a*4 (vertically downward, reverse direction to a direction of displacement). Therefore, the developer receiving portion 11 moves against the urging force of the urging member 12 when the receiving opening 11*a* moves toward the container discharge opening 3*a*4 (upward in the vertical direction). Here, in the present specification, the direction in which the developer receiving portion 11 displaces in accordance with the mounting operation of the developer supply container 1 is an upward direction in the vertical direction. This direction is called upward (displacing direction, upward in the vertical direction) U, and the downward vertical direction in the opposite direction is called the downward direction D.

In addition, as shown in part (a) of FIG. 4, in the mounting portion 8*f* of the developer receiving apparatus 8, a first shutter stopper portion 8*a* and a second shutter stopper portion 8*b* are provided on the upstream side of the developer receiving portion 11 in the mounting direction A. In the developer supply container 1 which is moving relative to the developer receiving apparatus 8 during mounting/dismounting, the first and second shutter stopper portions 8*a* and 8*b* regulate the relative movement of the shutter 4 (part (b) of FIG. 5) which will be described hereinafter relative to the developer receiving apparatus 8. In this case, the shutter 4 moves relative to a part of the developer supply container 1 other than the shutter 4, such as the container body 2 described hereinafter.

As shown in part (b) of FIG. 3 and part (b) of FIG. 4, below, in the downward direction D, of the developer receiving apparatus 8, there is provided a sub-hopper 8*c* for temporarily storing the developer supplied from the developer supply container 1. Inside the sub-hopper 8*c*, there are provided a feeding screw 14 for feeding the developer to the developer hopper portion 201*a* (FIG. 1) which is a portion of the developing device 201, and an opening 8*d* communicating with the developer hopper portion 201*a*.

As shown in part (c) of FIG. 4, the developer receiving portion 11 is provided with a main assembly seal 13 formed so as to surround the receiving opening 11*a*. The main assembly seal 13 is made of elastic material, foam or the like. As shown in part (a) of FIG. 16, in the state that the developer supply container 1 is mounted, the main assembly seal 13 is in close contact with an opening seal 3*a*5 surrounding the container discharge opening 3*a*4 of the developer supply container 1, with the shutter 4 described hereinafter sandwiched therebetween. By this, the developer discharged through the container discharge opening 3*a*4 of the developer supply container 1 to the receiving opening 11*a* by way of the shutter opening (discharge port) 4*j* of the shutter 4 does not leak out of the receiving opening 11*a* which is a part of the developer feeding passage. That is, the main assembly seal 13 is provided around the receiving opening 11*a*, and when the communication between the receiving opening 11*a* and the shutter opening 4*j* is established, the sealing is performed by elastic deformation between the receiving opening 11*a* and the shutter opening 4*j*.

Here, it is desirable that a diameter of the receiving opening 11*a* is substantially the same as or slightly larger than a diameter of the shutter opening 4*j* of the shutter 4, in order to prevent the interior of the mounting portion 8*f* from being contaminated by the developer. This is because if the diameter of the receiving opening 11*a* is smaller than the diameter of the shutter opening 4*j*, the developer discharged from the shutter opening 4*j* is more likely to be deposited on the upper surface of the main assembly seal 13. If the developer is deposited on the lower surface of the developer supply container 1 at the time of mounting/dismounting operation of the developer supply container 1, it becomes a cause of contamination by the developer. In view of this point, it is preferable that the diameter of the receiving opening 11*a* is roughly the same as or about 2 mm larger than the diameter of the shutter opening 4*j*. For example, in the case that the diameter of the shutter opening 4*j* of the shutter 4 is a fine hole (pinhole) of about 2 mm in diameter, it is preferable that the diameter of the receiving opening 11*a* is about 3 mm.

In addition, as shown in part (c) of FIG. 4, on the side surface of the developer receiving portion 11, an engaged portion (portion to be engaged) 11*b* projecting toward the center side is provided. In the case of this embodiment, the engaged portion 11*b* is directly engaged with the engaging portion 30 (part (a) in FIG. 7) provided in the developer supply container 1 which will be described hereinafter, and is guided by the engaging portion 30, by which the developer receiving portion 11 is lifted toward the developer supply container 1 in the upward direction U.

[Developer Supply Container]

Figure 5:
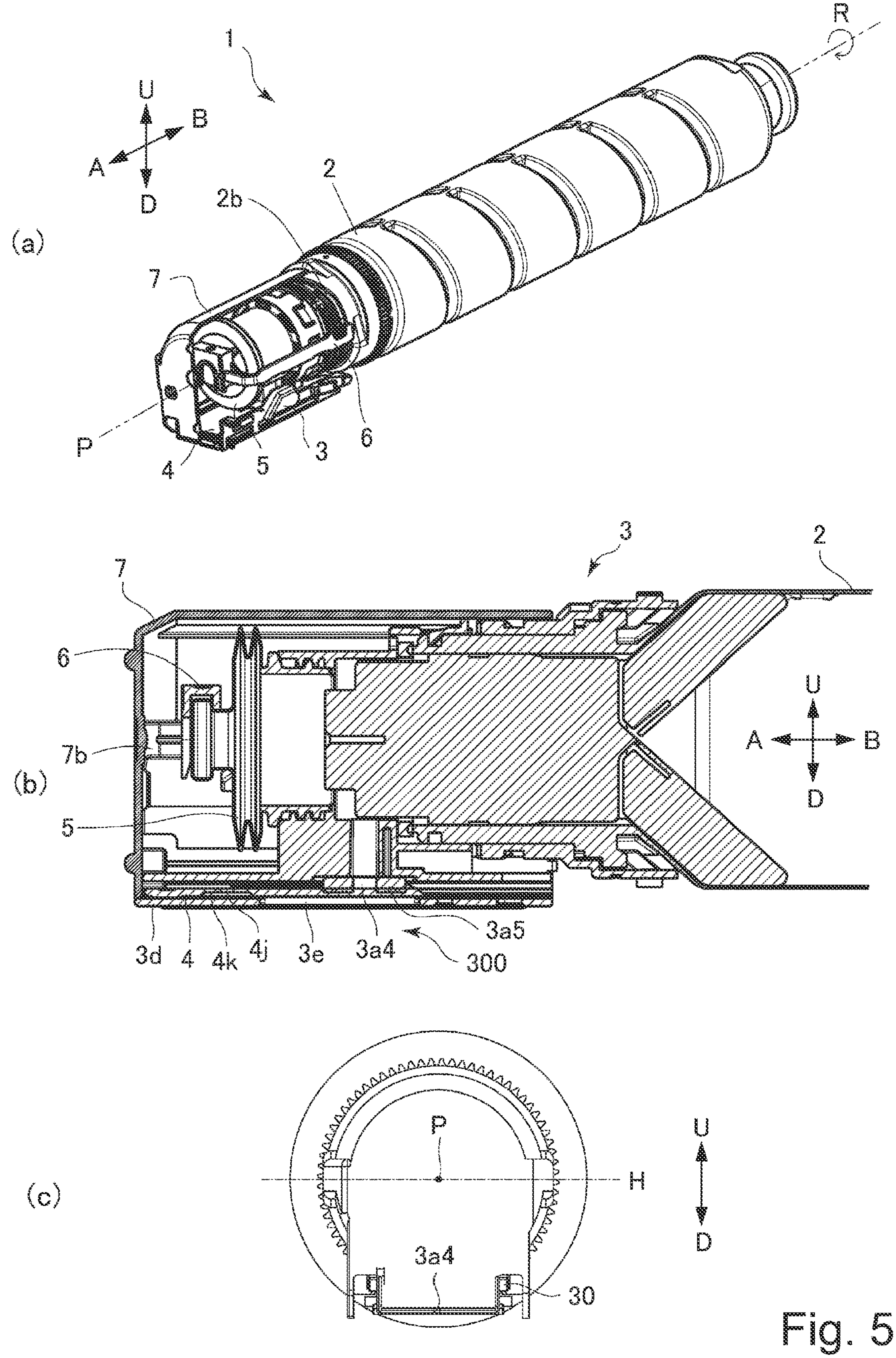
FIG. 5 is a perspective view of a developer supply container according to the embodiment, wherein part (a) is a partial cut perspective view, part (b) thereof is a cross-sectional view around a flange portion, and part (c) thereof is a front view seen from the front.

Next, referring to part (a) FIG. 5 to part (b) of FIG. 15, the developer supply container 1 constituting the developer supplying system 200 will be described. First, referring to part (a) of FIG. 5 and part (b) of FIG. 5, the overall structure of the developer supply container 1 will be described. The developer supply container 1 mainly includes the container body 2, a flange portion 3, the shutter 4, a pump portion 5, a reciprocating member 6, and a cover 7. The container body 2 supplies the developer to the developer receiving apparatus 8 by rotating in the developer receiving apparatus 8 in the direction indicated by an arrow R about the rotation axis P shown in part (a) of FIG. 5. In the following, each element constituting the developer supply container 1 will be described in detail. Here, in this embodiment, the direction of the rotation axis P is the same as a rotation axis direction, and is the same as the mounting/dismounting directions parallel with the mounting direction A and the dismounting direction B.

[Container Body]

Figure 6:
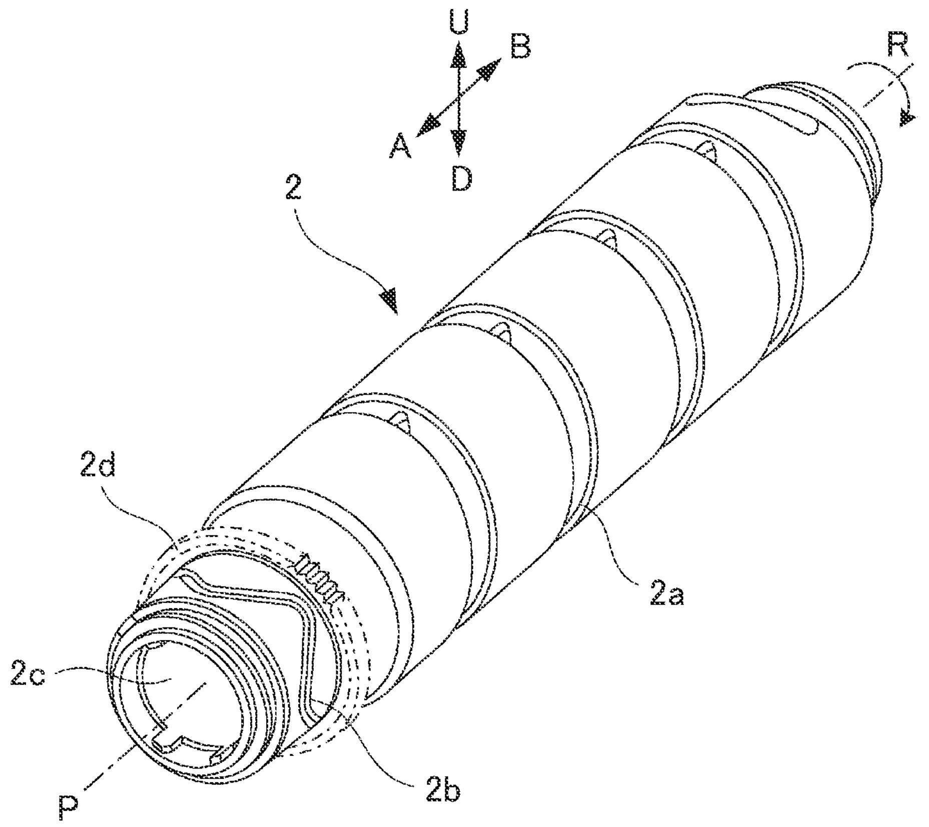
FIG. 6 is a perspective view of a container body of the developer supply container according to the embodiment.

As shown in FIG. 6, the container body 2 mainly comprises a developer accommodating portion 2*c* for containing the developer. In addition, the container body 2 is provided with a helical feeding groove 2*a* (feeding portion) for feeding the developer in the developer accommodating portion 2*c* by rotating the container body 2 in the direction of the arrow R around the rotation axis P. Here, in this embodiment, the cam groove 2*b* and the drive receiving portion 2*d* are integrally formed with the container body 2, but the cam groove 2*b* or the drive receiving portion 2*d* may be formed as a separate member and may be integrally mounted to the container body 2. In addition, in this embodiment, a toner having a volume average particle diameter of 5 μm to 6 μm is accommodated in the developer accommodating portion 2*c* as a developer, for example. In addition, in this embodiment, the developer accommodating portion 2*c* is not only the container body 2, but also internal spaces of the container body 2, a flange portion 3 and the pump portion 5 which will be described later.

[Flange Portion]

Referring to part (a) of FIG. 5, part (b) of FIG. 5, part (a) of FIG. 7 and part (b) of FIG. 7, the flange portion 3 will be described. The flange portion 3 is mounted so as to be rotatable relative to the container body 2 about the rotation axis P. And, when the developer supply container 1 is mounted to the developer receiving apparatus 8, the flange portion 3 is held so as not to rotate in the arrow R direction relative to the mounting portion 8*f* (part (a) of FIG. 3). In addition, as shown in part (b) of FIG. 7, a container discharge opening 3*a*4 is provided in a portion of the flange portion 3, and an opening seal 3*a*5 is mounted to the periphery thereof. As shown in part (b) of FIG. 5, the flange portion 3 is provided with the pump portion 5, the reciprocating member 6, the shutter 4, and the cover 7.

First, the pump portion 5 is threaded at one end side (mounting direction A) of the flange portion 3, and the container body 2 is connected to the other end side (side in the dismounting direction B) with a sealing member (not shown) therebetween. In addition, a reciprocating member 6 is provided so as to sandwich the pump portion 5, and the engaging projection 6*b* (parts (a) and (b) of FIG. 14) provided on the reciprocating member 6 is engaged with the cam groove 2*b* (FIG. 6). The flange portion 3 is provided with the shutter 4. In this embodiment, the flange portion 3 and the shutter 4 constitute a discharge portion 300 for discharging the developer accommodated in the developer accommodating portion 2*c* out. In addition, the surface on which the shutter 4 is provided is the bottom side of the flange portion 3, more particularly, the top surface of the bottom portion 3*d*. In order to improve an outer appearance and to protect the reciprocating member 6 and pump portion 5, the cover 7 is integrally assembled so as to cover the whole of the flange portion 3, the shutter 4, the pump portion 5, and the reciprocating member 6 as shown in parts (a) and (b) of FIG. 5.

Figure 7:
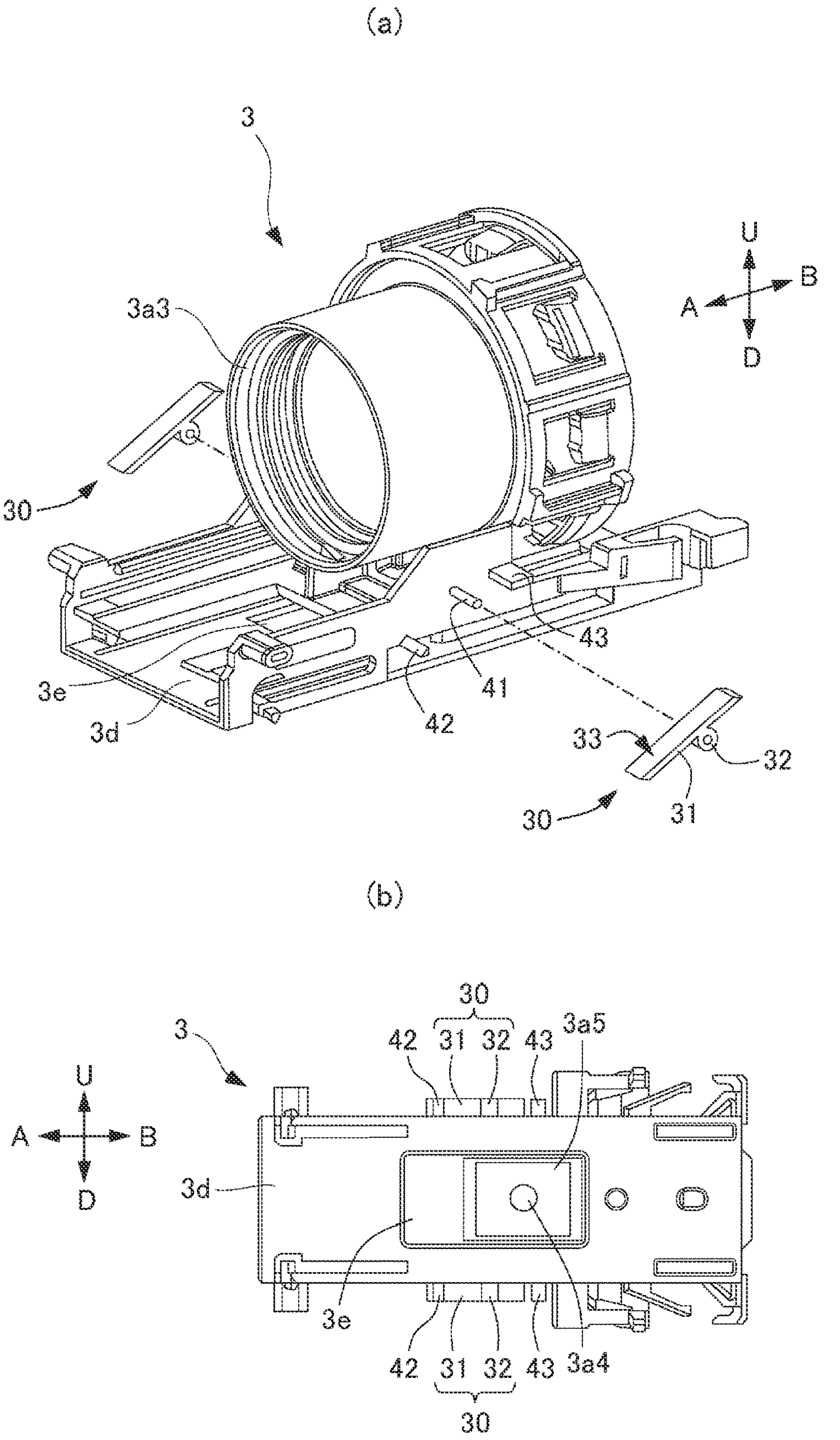
FIG. 7 illustrates a flange portion according to the embodiment, wherein part (a) thereof is a perspective view, and part (b) thereof is a bottom view.

In addition, as shown in parts (a) and (b) of FIG. 7, the flange portion 3 has a flat bottom portion 3*d* provided horizontally and an opening portion 3*e* formed in a substantially central portion of the bottom portion 3*d*, the opening portion 3*e* penetrating in a vertical direction. As shown in part (b) of FIG. 5, the bottom portion 3*d* slidably supports the shutter 4 at the lower portion. As shown in part (a) of FIG. 15, when the main assembly seal 13 and the receiving opening 11*a* of the developer receiving portion 11 are displaced in the upward direction U, they pass through the opening portion 3*e*.

As shown in part (a) of FIG. 7, on each of side walls of the flange portion 3 with respect to the widthwise direction of the flange portion 3 perpendicular to the direction of insertion and removal and the vertical direction, a pivot shaft 41 projecting outward in the width direction is provided. In addition, in the wall portions of the flange portion 3, the first positioning portion 42 is provided on the mounting direction A side of the pivot shaft 41, and the second positioning portion 43 is provided on the side of the pivot shaft 41 in the dismounting direction B. On the pivot shaft 41, the engaging portion 30 is rotatably supported, and the engaging portion 30 is fixed by a snap fit (not shown) for preventing disengagement. A pivot shaft 41 is provided in the discharge portion 300 so as to rotatably support the engagement portion 30 in such a position that end portions of the engagement portion 30 are possible to rotate.

[Engagement Portion]

As shown in part (a) of FIG. 7, the flange portion 3 is provided with an engaging portion 30 engageable with the engaged portion 11*b* (part (a) of FIG. 3) of the developer receiving portion 11. Part (c) of FIG. 5 is a front view of the developer supply container 1. As shown in part (c) of FIG. 5, the engaging portion 30 is disposed below a plane H including the rotation axis P. Further, the plane H including the rotation axis P is a horizontal plane, and the engaging portion 30 is disposed below this horizontal plane. The engaging portion 30 engages with the engaged portion 11*b* with the mounting operation of the developer supply container 1 and moves the developer receiving portion 11 in the upward direction U such that the receiving opening 11*a* communicates with the shutter opening 4*j* (part (a) of FIG. 16). At this time, a developer supply container 1 and the developer receiving portion 11 are connected with each other enable supplying of the developer from the developer supply container 1 to the developer receiving portion 11. In addition, in order to break the connection state between the developer supply container 1 and the developer receiving portion 11 with the takeout operation of the developer supply container 1, the engaging portion 30 performs a guiding operation such that the developer receiving portion 11 is displaced in the downward direction D away from the developer supply container 1. Here, as shown in parts (a) and (b) of FIG. 7, in this embodiment, the engaging portion 30 is provided on each side of the flange portion 3 with respect to the width direction perpendicular to the insertion/extracting direction to the vertical direction.

Figure 8:
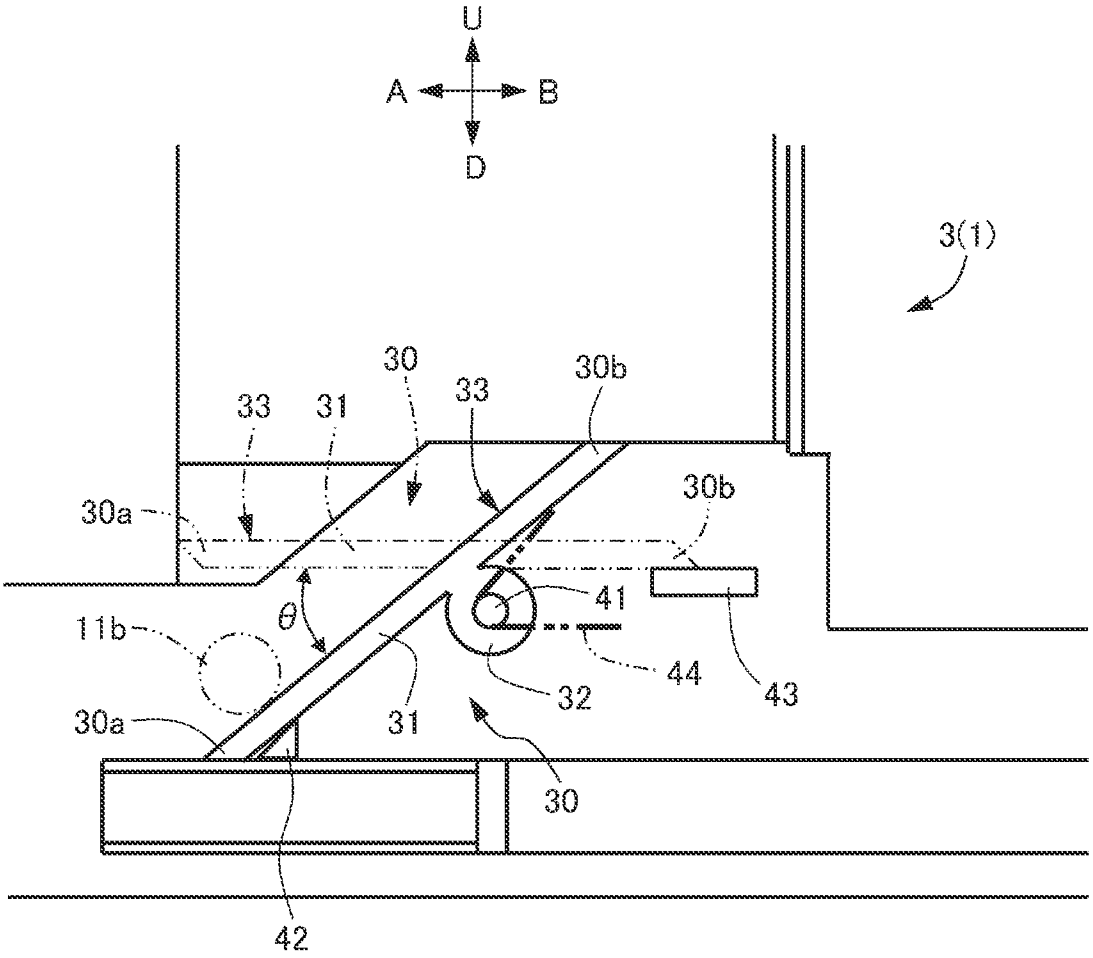
FIG. 8 is a side view of an engaging portion according to the embodiment.

As shown in part (a) of FIG. 7 and FIG. 8, the engaging portion 30 is a substantially plate-like member and is provided so as to be able to swing around a pivot shaft 41 between a first position (a first state, a solid line in FIG. 8) and a second position (a second state, an imaginary line in FIG. 8). The engaging portion 30 swings from the first position to the second position with the mounting operation of the developer supply container 1. The engaging portion 30 includes, at a front side, a plate-shaped flat plate portion 31 including a flat engaging surface 33 engageable with the engaged portion 11*b* on a front side, and a bearing portion 32 formed on the back side and pivotally supported on the pivot shaft 41 so as to be swingable. The engaging surface 33 engaging with the engaged portion 11*b* of the engaging portion 30 is a flat surface.

As indicated by the solid line in FIG. 8, at the first position of the engaging portion 30, the engaging surface 33 of the engaging portion 30 is directed upward (direction U) toward the upstream side in the mounting direction A of the developer supply container 1. That is, the engaging portion 30 has a free end portion 30*a* (one end portion) on the side remote from the developer accommodating portion 2*c* in the direction of the rotation axis P and a free end portion 30*b* (other end portion) on the near side, and in the first position, the free end portion 30*a* is below the free end portion 30*b*. In addition, the engaging portion 30 is inclined with respect to the rotational axis P when it is in the first position. In addition, as shown in phantom lines in FIG. 8, at the second position of the engaging portion 30, the inclination of the engaging portion 30 with respect to the mounting direction A of the engaging surface 33 is smaller than in the first position. In this embodiment, at the second position of the engaging portion 30, the engaging surface 33 is substantially parallel with the mounting direction A when the engaging portion 30 comes into contact with a second positioning portion 43. That is, an inclination angle of the engaging portion 30 with respect to the rotation axis P when in the second position is about 0°. In the first position of the engaging portion 30, the engaging surface 33 is inclined by a predetermined inclination angle θ with respect to the mounting direction A. This inclination angle θ may be, for example, about 30 degrees to 60 degrees.

In addition, a first positioning portion 42 formed on the flange portion 3 abuts against the back side of the free end portion 30*a* on the mounting direction A side of the engaging portion 30, thereby positioning the engaging portion 30 to the first position. That is, the positioning portion 42 functions as a regulating portion for regulating the rotation of the engaging portion 30. The second positioning portion 43 positions the engaging portion 30 at the second position, by the abutting against the back side of the free end portion 30*b* on the dismounting direction B side of the engaging portion 30. The engaging portion 30 is urged by a torsion coil spring (urging portion) 44 so as to contact the first positioning portion 42. That is, the torsion coil spring 44 maintains the first state in which the free end portion 30*a* is below the free end portion 30*b*. Therefore, when the developer supply container 1 is inserted into the image forming apparatus 100, the engaging portion 30 abuts against the first positioning portion 42. Here, the engaging portion 30 is positioned on the pivot shaft 41 by a snap fit in the width direction in order not to separate from the pivot shaft 41.

In a state in which the engaging portion 30 is in contact with the first positioning portion 42, the engaging portion 30 is inclined by the inclination angle θ relative to the mounting direction A of the developer supply container 1 to the developer receiving apparatus 8. Therefore, by inserting the developer supply container 1 into the developer receiving apparatus 8, the engaging portion 30 displaces the developer receiving portion 11 in the upward direction U crossing the mounting direction A of the developer supply container 1 the opening operation of the developer receiving portion 11 in the upward direction U is performed. On the other hand, in a state in which the engaging portion 30 is in contact with the second positioning portion 43, the engaging portion 30 is parallel with the mounting direction A of the developer supply container 1 to the developer receiving apparatus 8. In addition, in this embodiment, in a state in which the engaging portion 30 is in contact with the second positioning portion 43, the engaging portion 30 is parallel to the rotation axis P and parallel to the horizontal plane. Therefore, while the developer supply container 1 moves relative to the container discharge opening 3*a*4, that is, while the receiving opening 11*a* moves to the position where it connects with the container outlet 3*a*4, the main assembly seal 13 and the shutter opening 4*j* are kept connected (part (a) of FIG. 16).

In addition, in this embodiment, the bearing portion 32 pivotally supported by the pivot shaft 41 is provided at the lower side of the flat plate portion 31 slightly upstream in the mounting direction A. With respect to the mounting direction A, the pivot shaft 41 is provided between the free end portion (upstream side end portion) 30*b* on the upstream side of the engaging portion 30 and the free end portion (downstream side end portion) 30*a* on the downstream side, at the position where the engaging portion 30 swings between the first position and the second position by the engagement of the engaged portion 11*b*. In addition, the pivot shaft 41 is disposed below the rotation axis P in the vertical direction and above the shutter opening 4*j*. In addition, the pivot shaft 41 is arranged at a position more remote from the developer accommodating portion 2*c* than the shutter opening 4*j* in the direction of the rotation axis P. The pivot shaft 41 projects from the side surface of the discharge portion 300. However, the position of the bearing portion 32 and the position of the pivot shaft 41 with respect to the flat plate portion 31 can be appropriately selected depending on the structure and size of each portion.

[Shutter]

Figure 9:
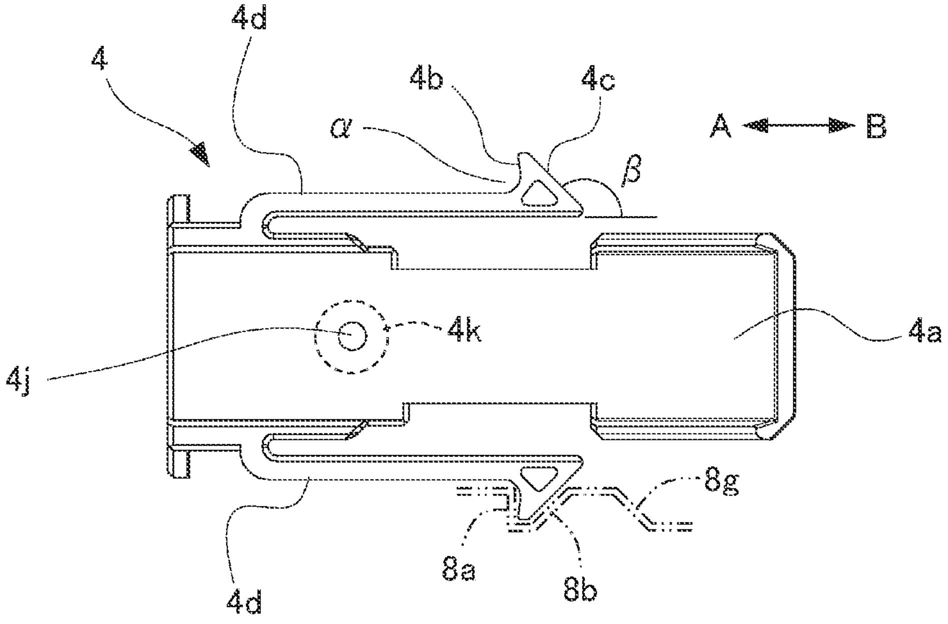
FIG. 9 illustrates a shutter according to the embodiment, wherein part (a) thereof is a top view, and part (b) thereof is a perspective view.
Figure 9:
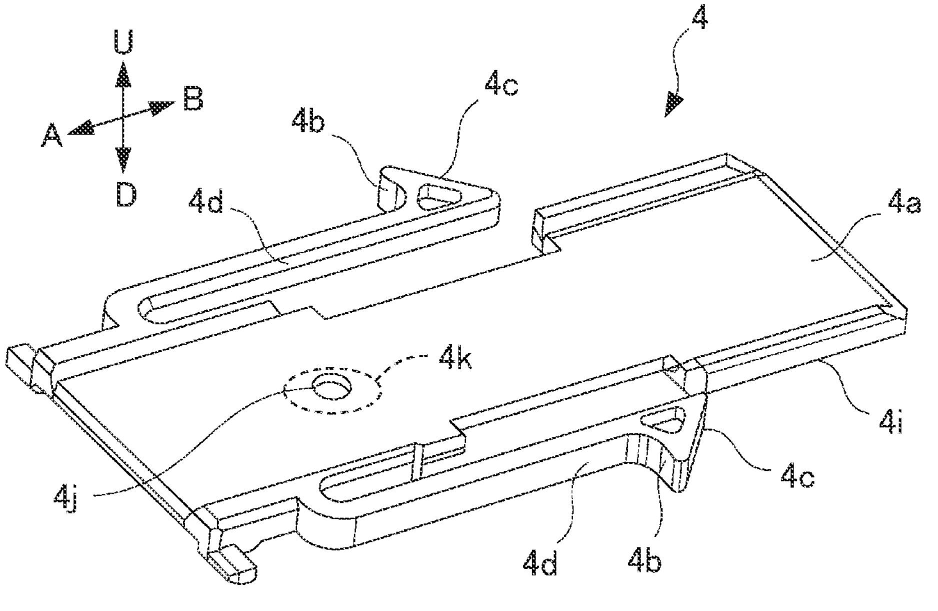

Next, referring to parts (a) and (b) of FIG. 9 the shutter 4 will be described. The shutter 4 slidable on the upper surface of the bottom portion 3*d* (part (a) of FIG. 7) of the flange portion 3 move relative to a portion (flange portion 3) of the developer supply container 1. The shutter 4 has a shutter opening 4*j* as a discharge opening, and opens and closes the container discharge opening 3*a*4 (part (b) in FIG. 7) of the developer supply container 1 in accordance with the mounting and dismounting operation of the developer supply container 1. That is, by moving the shutter 4 relative to the developer supply container 1 in accordance with the mounting operation of the developer supply container 1, the receiving opening 11*a* of the developer receiving portion 11 and the shutter opening 4*j* communicate with each other, and in addition with the container discharge opening 3*a*4. By this, the developer in the developer supply container 1 can be discharged to the receiving opening 11*a*. That is, the discharge portion 300 (part (b) of FIG. 5) for discharging the developer is constituted by the flange portion 3 and the shutter 4, and the shutter 4 of the discharge portion 300 is provided in a bottom surface with the shutter opening 4*j* as the discharge opening for discharging the developer.

In addition, the shutter 4 is provided with a connecting surface 4*k* connected to the developer receiving portion 11 so as to surround the shutter opening 4*j*, on the sliding surface 4*i* opposite to the bottom portion 3*d*. The connecting surface 4*k* has a larger diameter than the shutter opening 4*j* and is parallel to the sliding surface 4*i*. After mounting the developer supply container 1, the upper end surface of the main assembly seal 13 is brought into close contact with the connecting surface 4*k*.

Figure 12:
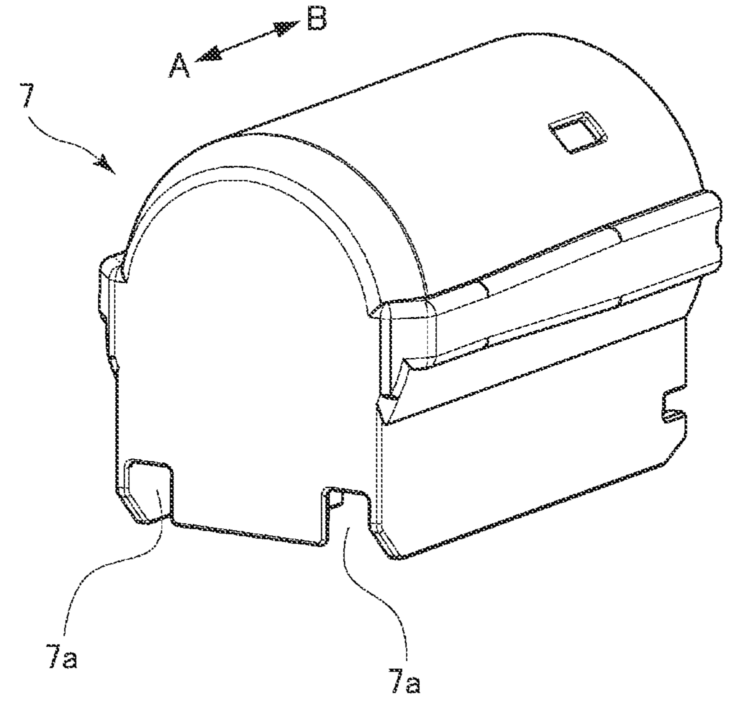
FIG. 12 illustrates a cover according to the embodiment, wherein part (a) thereof is a perspective view, and part (b) thereof is a perspective view from the opposite side of part (a).
Figure 12:
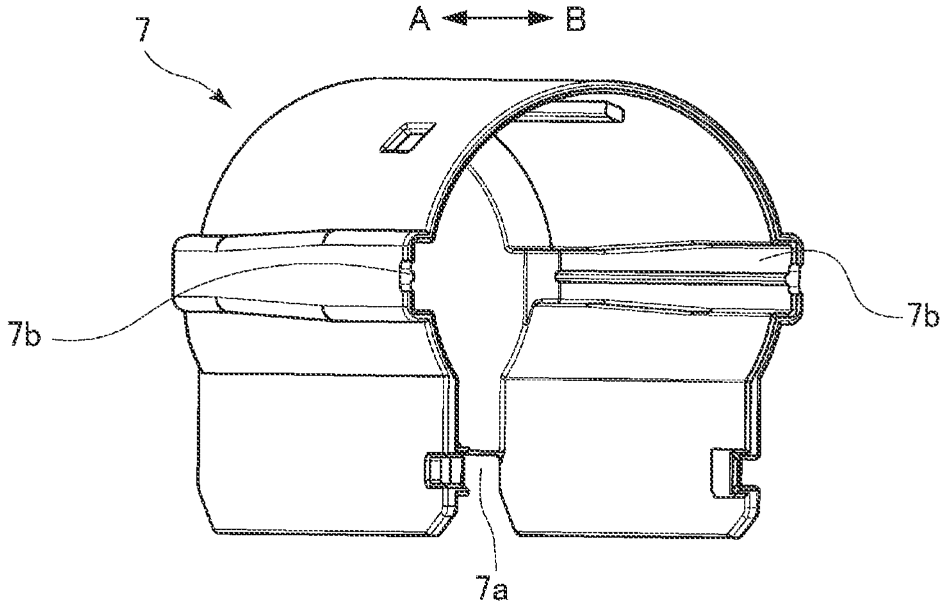

On the other hand, as shown in parts (a) and (b) of FIG. 12, a developer sealing portion 4*a* is provided at a position deviated from the shutter opening 4*j* of the shutter 4. The developer sealing portion 4*a* closes the container discharge opening 3*a*4, and as the shutter 4 moves relative to the developer supply container 1 in accordance with the operation of taking out the developer supply container 1. In addition, the developer sealing portion 4*a* prevents leakage of the developer from the container discharge opening 3*a*4, when the developer supply container 1 is not mounted to the mounting portion 8*f* (part (a) of FIG. 3) of the developer receiving apparatus 8. A sliding surface 4*i* sliding on the upper surface of the bottom portion 3*d* of the flange portion 3 is provided on a back surface side (the developer receiving portion 11 side) of the developer sealing portion 4*a*. Here, the shutter 4 is engaged with the flange portion 3 in an attitude in which the developer sealing portion 4*a* faces upward.

The shutter 4 is provided with a first stopper portion 4*b* and a second stopper portion 4*c* held by first and second shutter stopper portions 8*a* and 8*b* (part (a) of FIG. 4) of the developer receiving apparatus 8 doing so that the developer supply container 1 is capable of moving relative to the shutter 4. In addition, the shutter 4 is provided with a support portion 4*d* for displaceably supporting the first and second stopper portions 4*b* and 4*c*. The support portion 4*d* is elastically deformable and extends from one side to other side of the developer sealing portion 4*a*. And, the first stopper portion 4*b* and the second stopper portion 4*c* are provided at the free end portion of the support portion 4*d*. By this, the first and second stopper portions 4*b*, 4*c* can be displaced by the elasticity of the support portion 4*d*.

Here, the first stopper portion 4*b* is inclined so that an angle α formed by the first stopper portion 4*b* and the support portion 4*d* is an acute angle. On the contrary, the second stopper portion 4*c* is inclined so that an angle β formed by the second stopper portion 4*c* and the support portion 4*d* is an obtuse angle.

When the developer supply container 1 is mounted, the first stopper portion 4*b* is engaged with the guide portion 8*g* of the developer receiving apparatus 8 and is displaced to pass through the second shutter stopper portion 8*b*, thus engaging with the first shutter stopper portion 8*a*. As the first stopper portion 4*b* and the first shutter stopper portion 8*a* are engaged with each other, the position of the shutter 4 with respect to the developer receiving apparatus 8 is fixed. The second stopper portion 4*c* is engaged with the second shutter stopper portion 8*b* of the developer receiving apparatus 8 to release the first stopper portion 4*b* from the first shutter stopper portion 8*a* at the time of removing the developer supply container 1. By this, the shutter 4 is dismounted from the developer receiving apparatus 8.

[Pump Portion]

Referring to parts (a) and (b) of FIG. 10, the pump portion 5 will be described. The pump portion 5 alternately and repeatedly changes the internal pressure of the developer accommodating portion 2*c*, switching between a state lower than the atmospheric pressure and a state higher than atmospheric pressure by the driving force received by the drive receiving portion 2*d* of the container body 2 (FIG. 6). In this embodiment, in order to stably discharge the developer through the small container discharge opening 3*a*4 as described above, the pump portion 5 is provided at a portion of the developer supply container 1. The pump portion 5 is a displacement type pump in which a volume is changed. More specifically, the pump portion 5 employed in this embodiment has a bellows-like stretchable member capable of expanding and contracting.

The pressure inside the developer supply container 1 is changed by the expansion and contracting operations of the pump portion 5, and the developer is discharged by utilizing the pressure. More specifically, when the pump portion 5 is contracted, the interior of the developer supply container 1 is brought into a compressed state, and the developer is pushed out to discharge through the container discharge opening 3*a*4 of the developer supply container 1. In addition, when the pump portion 5 is expanded, the interior of the developer supply container 1 is brought into a reduced pressure state, and the air is taken in from the outside through the container discharge opening 3*a*4. By air taken in, the developer in the container discharge opening 3*a*4 and in the neighborhood of the storage portion 3*a*3 (part (a) in FIG. 7) that stores the developer transported from the container body 2 of the flange portion 3 is loosened and smoothly discharged.

That is, in the neighborhood of the container discharge opening 3*a*4 of the developer supply container 1 and the neighborhood of the storage portion 3*a*3, the developer in the developer supply container 1 may gather due to vibrations imparted when transporting the developer supply container 1 and so on, with the possible result that the developer is caked in this portion. Therefore, as described above, the air is taken in through the container discharge opening 3*a*4, so that it is possible to loosen the developer that has been caked. In addition, in the usual discharging operation of the developer, as air is taken in as described above, the air and the powder as the developer are mixed with the result that the flowability of the developer is enhanced, and therefore, clogging of the developer does not easily occur, as an additional advantage. By repeatedly performing the expansion and contracting operation as described above, the developer is discharged.

Figure 10:
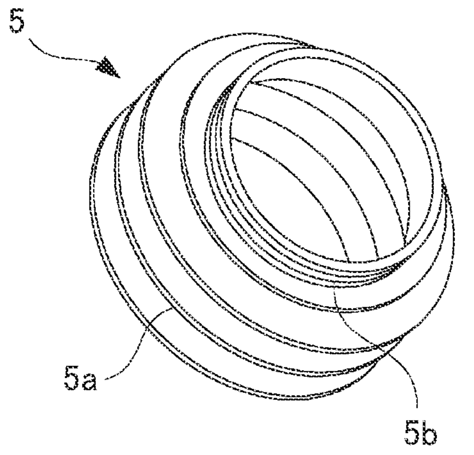
FIG. 10 shows a pump according to the embodiment, wherein part (a) thereof is a perspective view, and part (b) thereof is a side view.
Figure 10:
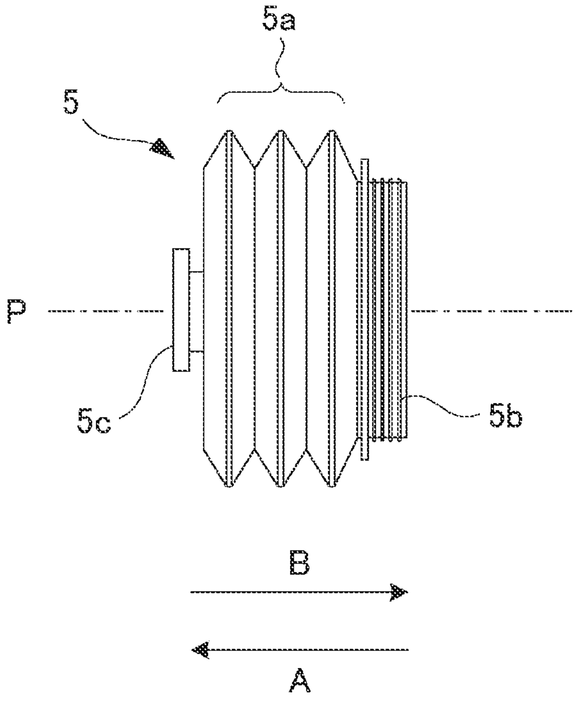

As shown in part (a) of FIG. 10, in the pump portion 5, a connecting portion 5*b* is provided so as to be able to be joined with the flange portion 3 on the opening end side (dismounting direction B). In this embodiment, screw threads are formed as the connecting portion 5*b*. In addition, as shown in part (b) of FIG. 10, the pump portion 5 has a reciprocating member engaging portion 5*c* which engages with the reciprocating member 6, which will be described hereinafter, on the other end side (the mounting direction A side) opposite to the opening end.

In addition, the pump portion 5 has a bellows-shaped expandable portion (bellows portion, expansion and contraction member) 5*a* in which crests and bottoms are alternately formed periodically. The expansion and contraction portion 5*a* is capable of contracting by moving the reciprocating member engaging portion 5*c* in the dismounting direction B with respect to the connecting portion 5*b* along the folding lines (with folding lines as the base point), and is capable of expanding by moving reciprocating member engaging portion 5*c* in the mounting direction A. Therefore, when the bellows-like pump portion 5 as employed in this embodiment, it is possible to reduce variations in volumetric change with respect to the expansion and contraction amount, and therefore, it is possible to accomplish the stable volumetric change.

Here, in this embodiment, polypropylene resin is used as the material of the pump portion 5, but the present invention is not limited to this example. As for the material (material) of the pump portion 5, any material may be used as long as it has an expansion and contraction function and is capable of changing the internal pressure of the developer accommodating portion by changing the volume. For example, ABS (acrylonitrile-butadiene-styrene copolymer), polystyrene, polyester, polyethylene, and so on are usable. Or, rubber, other stretchable materials or the like can also be used.

[Reciprocating Member]

Figure 11:
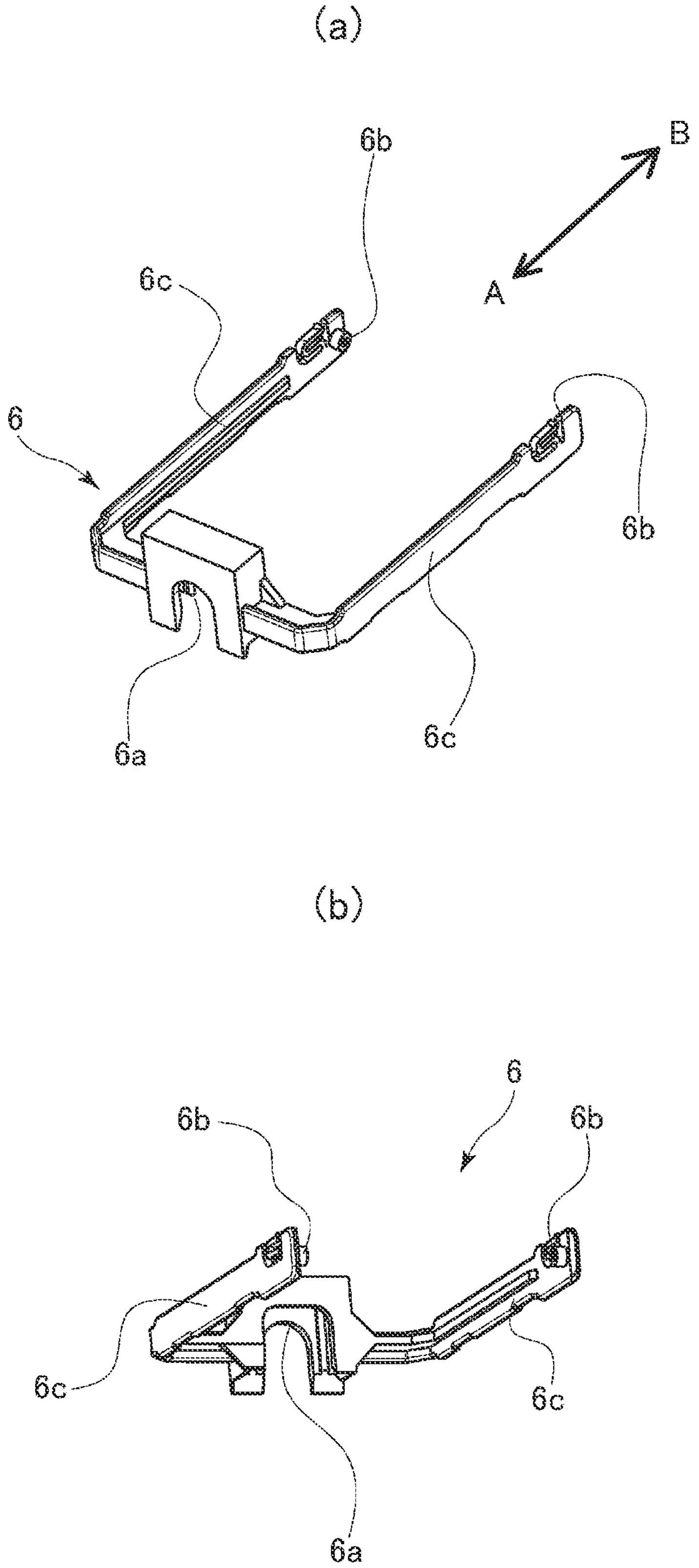
FIG. 11 illustrates a reciprocating member according to the embodiment, wherein part (a) thereof is a perspective view, and part (b) thereof is a perspective view seen from the opposite side of part (a).

Referring to parts (a) and (b) of FIG. 11, the reciprocating member 6 will be described. In order to change the volume of the pump portion 5, the reciprocating member 6 is provided with a pump engaging portion 6*a* (part (b) of FIG. 13) which engages with the reciprocating member engaging portion 5*c* provided on the pump portion (part (b) of FIG. 10). In addition, the reciprocating member 6 is provided with an engaging projection 6*b* to be engaged with the above-described cam groove 2*b* (FIG. 6) at the time of assembly. The engaging projection 6*b* is provided at the free end portion of the arm 6*c* extending in the mounting and dismounting direction from the neighborhood of the pump engaging portion 6*a*. In addition, the reciprocating member 6 is regulated in rotation around the rotation axis P (part (a) of FIG. 5) of the arm 6*c* by the reciprocating member holding portion 7*b* (part (b) of FIG. 12) of the cover 7 which will be described hereinafter. Therefore, when the container body 2 is driven by the drive receiving portion 2*d* by the driving gear 9, and the cam groove 2*b* rotates integrally, the reciprocating member 6 reciprocates back and forth in the directions A and B by the urging action of the engaging projection 6*b* fitted in the cam groove 2*b* and the reciprocating member holding portion 7*b* of the cover 7. Accordingly, the pump portion 5 engaged with the pump engaging portion 6*a* of the reciprocating member 6 by way of the reciprocating member engaging portion 5*c* expands and contracts in the dismounting direction B and the mounting direction A.

[Cover]

Referring to parts (a) and (b) of FIG. 12, the cover 7 will be described. As described above, the cover 7 is provided as shown in part (b) of FIG. 5 for the purpose of improving the appearance of the developer supply container 1 and protecting the reciprocating member 6 and the pump portion 5. In more detail, the cover 7 is provided so as to cover the entirety of the flange portion 3, the pump portion 5, and the reciprocating member 6. As shown in part (a) of FIG. 12, the cover 7 is provided with a guide groove 7*a* to be guided by the insertion guide 8*e* (part (a) of FIG. 3) of the developer receiving apparatus 8. In addition, as shown in part (b) of FIG. 15, the cover 7 is provided with a reciprocating member holding portion 7*b* for restricting rotation of the reciprocating member 6 about the rotation axis P (part (a) of FIG. 5).

[Mounting Operation of Developer Supply Container]

Figure 13:
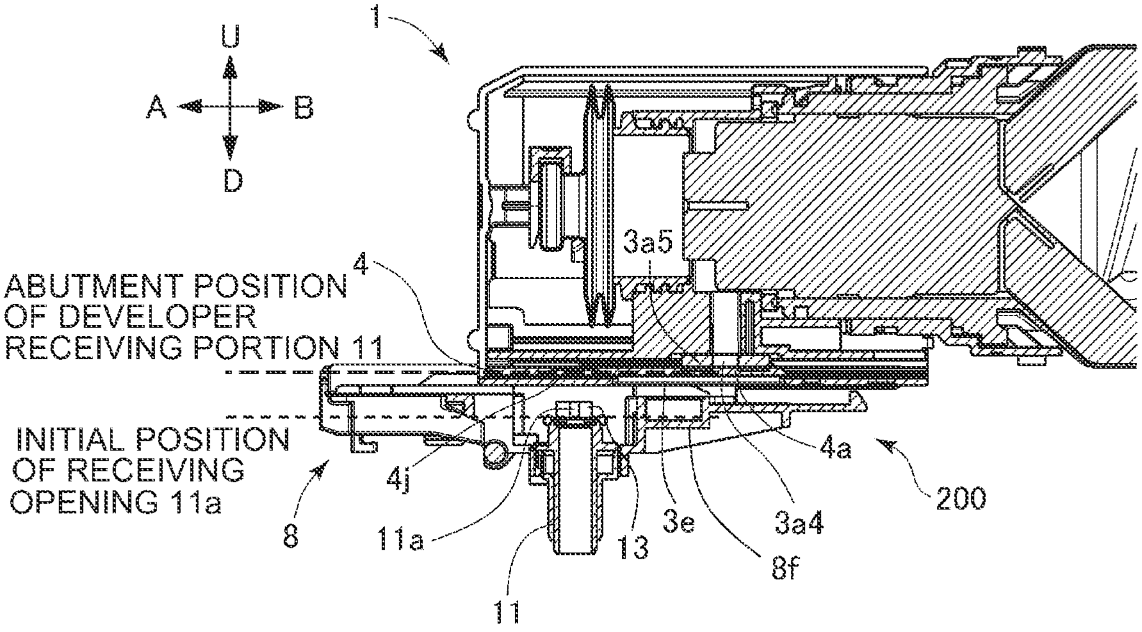
FIG. 13 illustrates a state before an engaged portion is engaged with an engaging surface when the developer supply container according to the embodiment is inserted, wherein part (a) thereof is a side view of a connecting portion between a shutter opening and a receiving port, and part (b) thereof is a side view of a flange.
Figure 13:
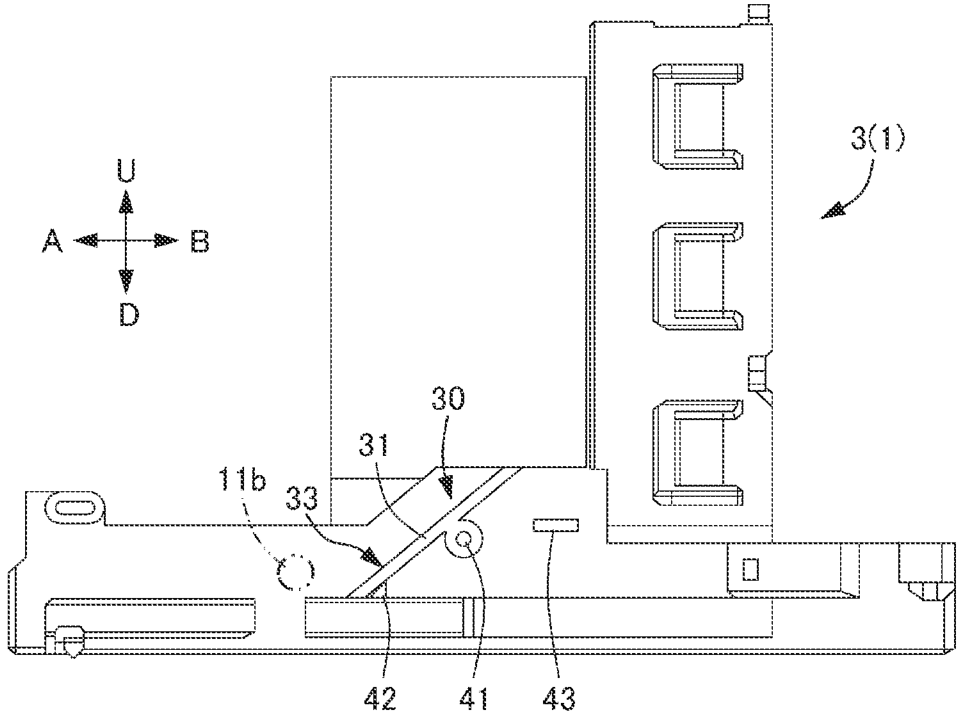
Figure 14:
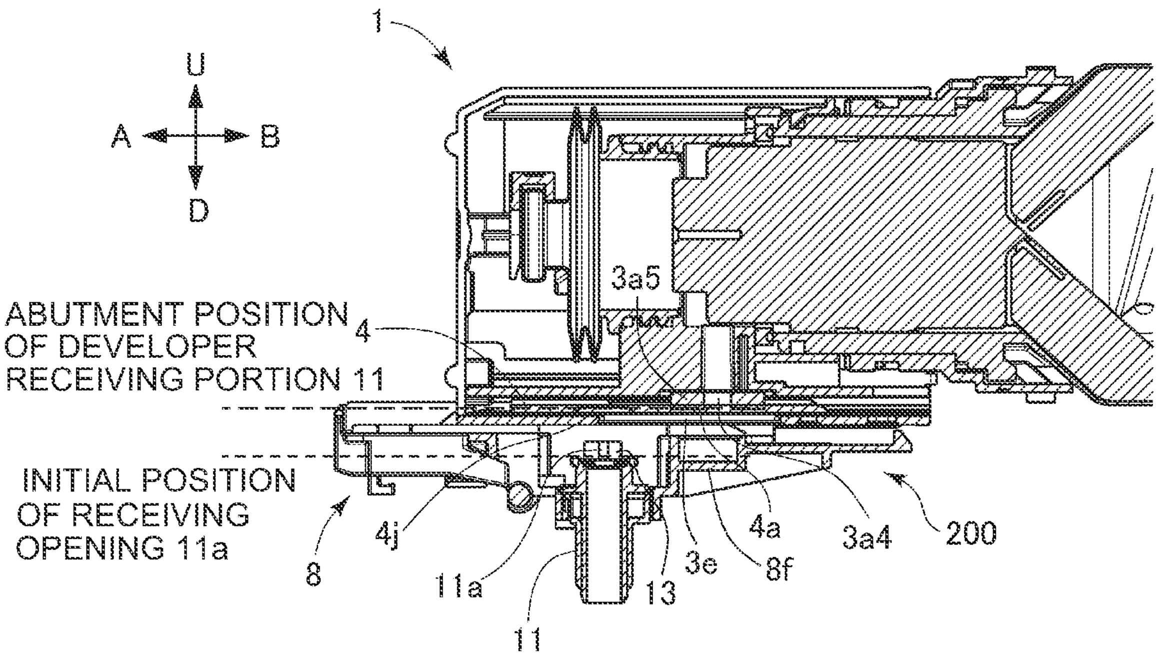
FIG. 14 illustrates a state when the engaged portion is engaged with the engaging surface in accordance with the insertion of the developer supply container according to the embodiment, wherein part (a) the end of is a side view of the connection portion between the shutter opening and the receiving port, and part (b) thereof is a side view of the flange.
Figure 14:
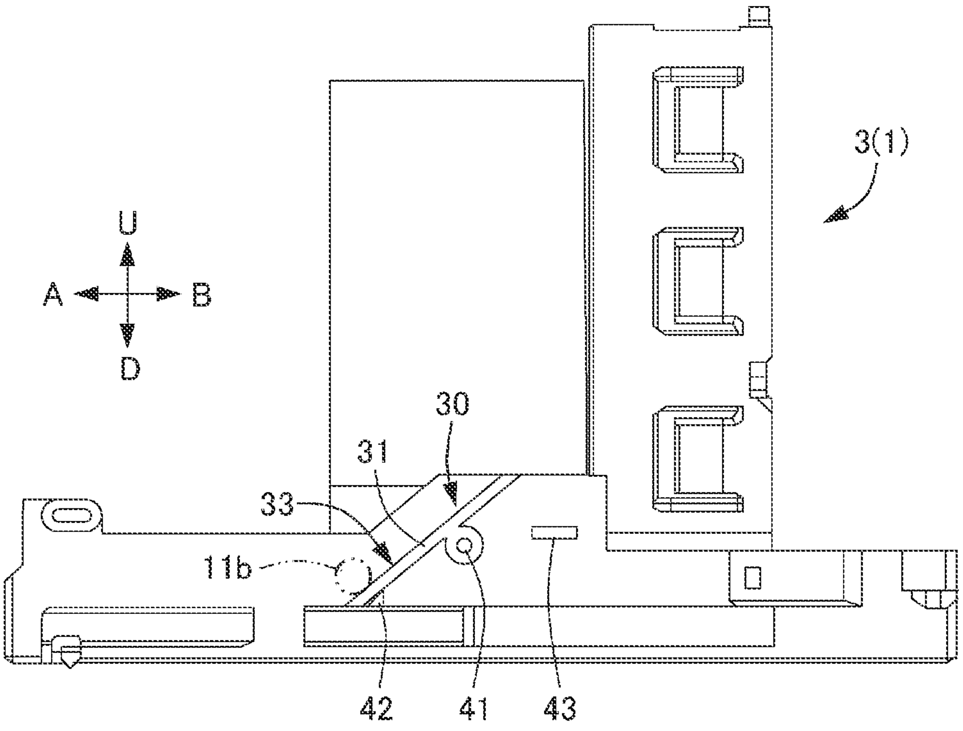

Referring to parts (a) of FIG. 13 to part (b) of FIG. 16, the operation of mounting the developer supply container 1 to the developer receiving apparatus 8 will be described. Here, part (a) and part (b) of FIG. 13 illustrate a state before the engaged portion 11*b* is engaged with the engaging surface 33 when the developer supply container 1 is inserted, and part (a) and part (b) of FIG. 14 illustrate a state when the engaged portion 11*b* is engaged with the engaging surface 33 as the developer supply container 1 is inserted. In addition, part (a) and part (b) of FIG. 15 illustrate a state immediately before the engaging portion 30 swings as the developer supply container 1 is inserted, and part (a) and part (b) of FIG. 16 illustrate a state after the engaging portion 30 is pivoted to the second position in accordance with completion of mounting of the developer supply container 1.

The developer supply container 1 is inserted into the image forming apparatus 100, and as shown in part (a) of FIG. 13, the developer supply container 1 is moved in the mounting direction A. Here, as shown in part (b) of FIG. 13, the engaging portion 30 and the engaged portion 11*b* have not yet engaged. Until this point, the relative position of the flange portion 3 and the shutter 4 has not changed, and therefore, the container discharge opening 3*a*4 is sealed by the developer sealing portion 4*a* of the shutter 4. At this time, as shown in part (a) of FIG. 9, in the shutter 4, stopper portions 4*b*, 4*c* are engaged with shutter stopper portions 8*a*, 8*b* of the developer receiving apparatus 8, and the position of the shutter 4 in the mounting direction A is fixed relative to the developer receiving apparatus 8. Therefore, after this, even if the developer supply container 1 is moved in the mounting direction A in the mounting direction A, the shutter 4 moves relative to the developer supply container 1 except the shutter 4, but does not move relative to the developer receiving portion 11 in the insertion/removal direction.

When the developer supply container 1 is further moved in the mounting direction A, as shown in part (a) of FIG. 14, the positions of the shutter 4 and the flange portion 3 are displaced relative to each other, but the position of the receiving opening 11*a* remains at the initial position and is not in contact with the shutter 4. At this time, as shown in part (b) of FIG. 14, the engaged portion 11*b* of the developer receiving portion 11 abuts against the lower side portion of the engaging surface 33 of the engaging portion 30. When the developer supply container 1 is further displaced in the mounting direction A from this state, the engaged portion 11*b* is displaced along the engaging surface 33 of the engaging portion 30. With the inserting operation of the developer supply container 1, the developer receiving portion 11 including the engaged portion 11*b* is lifted in the upward direction U. Here, in the case that the engaged portion 11*b* is below (lower side D side) of the pivot shaft 41, when a force for inserting the developer supply container 1 in the mounting direction A acts on the engaging portion 30, an external force in the counterclockwise rotational direction is applied to the engaging portion 30 in part (b) of Figure. However, since the swing of the engaging portion 30 in the counterclockwise rotational direction is restricted by the first positioning portion 42, the engaging portion 30 is not displaced.

When the developer supply container 1 is further moved in the mounting direction A, the engaged portion 11*b* of the developer receiving portion 11 is guided by the engaging surface 33, so that the developer receiving portion 11 is lifted in the upward direction U approaching the developer supply container 1. And, as shown in part (a) of FIG. 15, the developer receiving portion 11 is lifted upward in the direction U from the initial position, so that the receiving opening 11*a* comes into contact with the shutter opening 4*j* of the shutter 4. In this state, the shutter opening 4*j* and the container discharge opening 3*a*4 are not communicated, and therefore, the developer accommodated in the developer supply container 1 is not discharged to the developer receiving apparatus 8.

Figure 15:
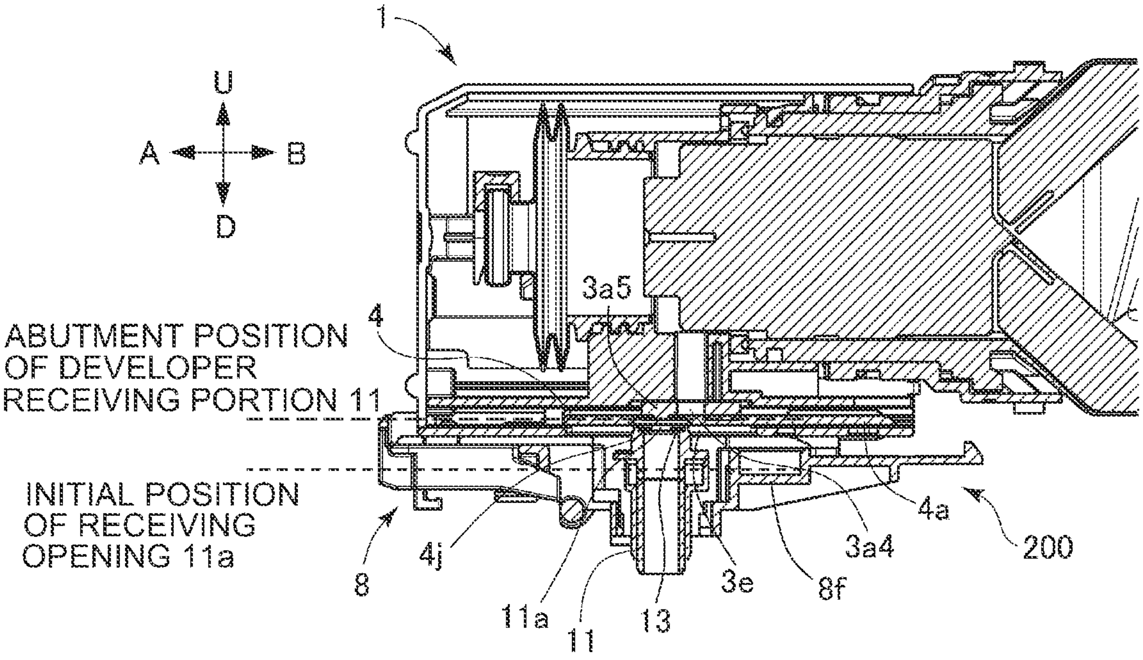
FIG. 15 shows a state immediately before when the engaging portion swings as the developer supply container according to the embodiment is inserted, wherein part (a) thereof is a side view of the connection portion between the shutter opening and the receiving port, and part (b) thereof is a side view of the flange.
Figure 15:
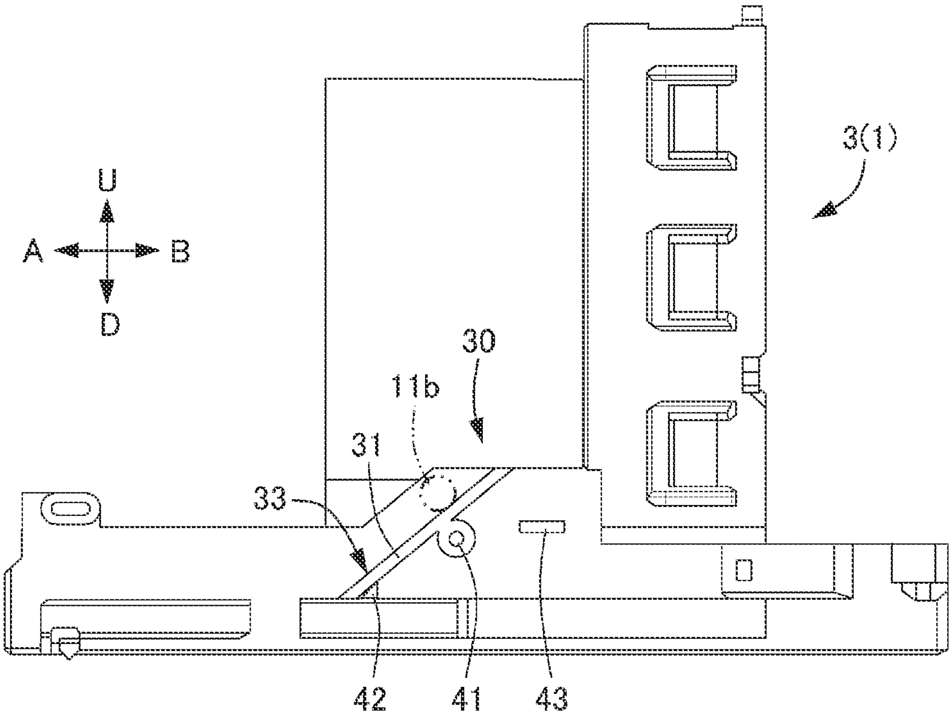
Figure 16:
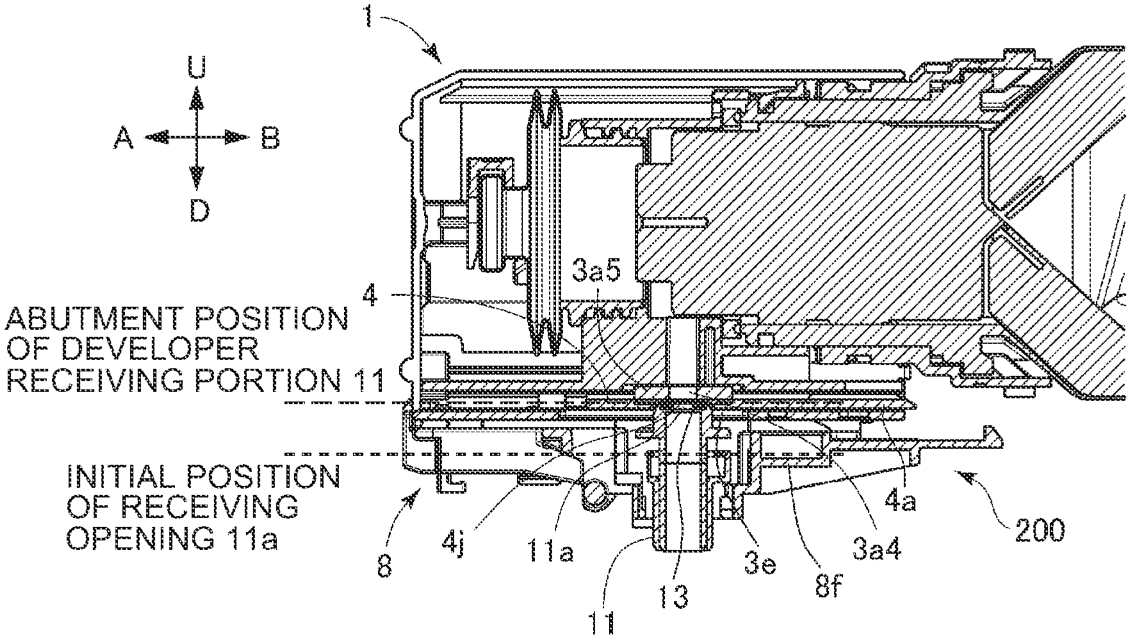
FIG. 16 illustrates a state after the engaging portion has swung to the second position in accordance with completion of mounting of the developer supply container according to the embodiment, wherein part (a) thereof is a side view of the connection portion between the shutter opening and the receiving port, and part (b) thereof is a side view of the flange.
Figure 16:
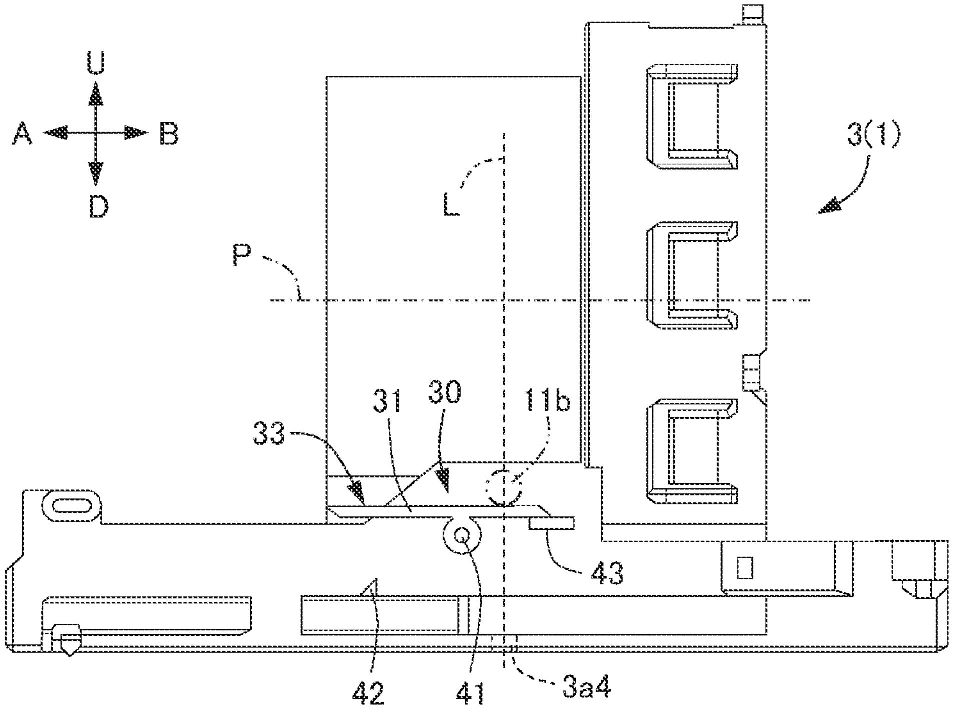

At this time, as shown in part (b) of FIG. 15, the engaged portion 11*b* rises along the engaging surface 33 of the engaging portion 30 and is displaced in the upper direction U side from the pivot shaft 41. In this state, when trying to further insert the developer supply container 1 in the mounting direction A, the engaging portion 30 swings about the pivot shaft 41 in the clockwise direction in the Figure. And, the engaging portion 30 abuts to the second positioning portion 43, so that the engaging portion 30 becomes horizontal with respect to the mounting direction A (part (b) of FIG. 16).

When the developer supply container 1 is further moved in the mounting direction A and pushed to the mounting completion position, as shown in part (a) of FIG. 16, the receiving opening 11*a* and the shutter opening 4*j* move relative to the flange portion 3, while they are in contact with each other while to become in fluid communication with the container discharge opening 3*a*4. In this state, the container outlet 3*a*4, the shutter opening 4*j* and the receiving opening 11*a* communicate with each other, and therefore, it is possible to supply the developer from the developer supply container 1 to the developer receiving apparatus 8. At this time, as shown in part (b) of FIG. 16, the engaging portion 30 is parallel to the mounting direction A of the developer supply container 1. For this reason, the developer receiving portion 11 including the engaged portion 11*b* is not lifted beyond the state in contact with the shutter 4, and no excessive force is applied to the engaged portion 11*b* and the like. Here, as shown in part (b) of FIG. 16, the positional relationship between the container outlet 3*a*4 and the engaging surface 33 is such that a plane L which passes through the container discharge opening 3*a*4 and perpendicular to the rotation axis P passes through the engaging surface 33. In addition, the plane including the engaging surface 33 is disposed between the rotation axis P and the container discharge opening 3*a*4. Further, the position of the plane L in the direction of the rotation axis P is on the side of the developer accommodating portion 2*c* with respect to the pivot shaft 41.

On the other hand, when removing the developer supply container 1 mounted to the apparatus main assembly 100*a*, the developer supply container 1 is displaced in the dismounting direction B. At this time, contrary to the time of mounting, it is taken out in the process of FIG. 16-FIG. 15-FIG. 14-Figure. In addition, since the engaging portion 30 is constantly urged toward the first positioning portion 42 by the torsion coil spring 44, the engaging portion 30 moves from part (b) in FIG. 16 to part (b) in FIG. 15. By this, the user simply takes out the used developer supply container 1 in the dismounting direction B and simply inserts the new developer supply container 1 in the mounting direction A, only by which the engaging portion 30 is automatically displaced and the developer supply container 1 can be exchanged and therefore, the replacing operation is made easier.

As described above, according to the developer supply container 1 of this embodiment, the engaged portion 11*b* is displaced along the engaging surface 33 of the engaging portion 30 at all times. Here, the engaged portion 11*b* contacts with the inclined engaging surface 33 for lifting the engaged portion 11*b* in the upward direction U at the time of starting insertion of the developer supply container 1, and with the horizontal engaged surface for maintaining the height of the engaged portion 11*b* when the developer supply container 1 is completely inserted. For this reason, the engaging surface does not suddenly change as in the case where the inclined engaging surface and the horizontal engaging surface are two flat folded surfaces, and the switching between the inclined engaging surface 33 and the horizontal engaging surface 33 can be smooth. Therefore, the operating force when mounting and dismounting the developer supply container 1 to/from the image forming apparatus 100 is reduced, and the operability is smooth, thus improving the operability. In addition, according to the developer supply container 1 of this embodiment, the engaging surface 33 is planar, and therefore, The complication of the shape of the engaging portion 30 can be suppressed.

Here, in the embodiment described above, as shown in FIG. 8, the engaging surface 33 of the engaging portion 30 is made flat but the present invention is not limited to this example. For example, the engaging surface 33 may have a curved surface shape.

In addition, in the above embodiment, as shown in FIG. 8, when the engaging portion 30 is positioned at the second position, the engaging surface 33 is parallel to the mounting direction A, but, the present invention is not limited to this example. For example, the engaging surface 33 may be provided so as to incline in the mounting direction A. In this case, a developer receiving apparatus withdrawing device is provided. By this, the developer supply container 1 is fixed to a predetermined mounting position in a state of being drawn in the mounting direction by the retracting device, and therefore, The developer supply container 1 will not move in the dismounting direction unless an operator intentionally removes it by applying force. Therefore, even if the engaging surface 33 is not a parallel surface, the engaged portion 11*b* will not unintentionally move in the dismounting direction B.

In addition, in the above embodiment, although the shutter opening 4*j* of the shutter 4 is the discharge opening with which the receiving opening 11*a* of the developer receiving portion 11 communicates, the present invention is not limited to this example. For example, the receiving opening of the developer receiving portion may be brought into direct contact with the container discharge opening of the developer supply container 1 without providing a shutter, so that these members communicate with each other. In this case, the container discharge opening corresponds to the discharge opening communicating with the receiving opening.

INDUSTRIAL APPLICABILITY

According to the present invention, there is provided a developer supply container and a developer supplying system capable of improving operability by reducing operating force when mounting a developer supply container.

DESCRIPTION OF REFERENCE NUMERALS

1: developer supply container; 2*c*: developer casing portion; 4*j*: shutter opening (discharge opening); 8: developer receiving device; 11: developer receiving portion; 11*a*: receiving opening; 11*b*: engaged portion; 30: engaging portion (engaging member); 30*a*: downstream end (downstream end); 30*b*: upstream free end (upstream end); 33: engaging surface; 41: oscillating shaft (Shaft portion); 42: first positioning portion; 43: second positioning portion; 44: torsion coil spring (biasing portion); 200: developer supply system; 300: discharge portion; A: mounting direction; U: upward direction (displacing direction).

The invention claimed is:

1. A developer supply container comprising:

a rotatable developer accommodating portion accommodating developer;

a developer discharging portion in fluid communication with the developer accommodating portion, the developer discharging portion being provided with a discharge opening for discharging the developer from the developer accommodating portion, and with the developer accommodating portion being rotatable about a first rotational axis and relative to the developer discharging portion; and a seesaw member provided at each of opposite lateral sides of the developer supply container, each seesaw member being positioned to not cover the discharge opening when the developer supply container is oriented with the discharge opening positioned at a bottom side of the developer discharging portion, with both of the seesaw members being rotatable about a second rotational axis that extends in a direction that crosses a direction of the first rotational axis.

2. The developer supply container according to claim 1, further comprising a first stopper portion provided at each of the opposite lateral sides of the developer supply container, each first stopper portion being configured to stop a rotation, in a first rotational direction, of an associated seesaw member, and a second stopper portion provided at each of the opposite lateral sides of the developer supply container, each second stopper portion being configured to stop a rotation, in a second rotational direction that is opposite to the first rotational direction, of the associated seesaw member.

3. The developer supply container according to claim 2, wherein an inclination angle θ of each seesaw member is 30 to 60 degrees when the associated seesaw member is stopped by the associated first stopper portion.

4. The developer supply container according to claim 3, wherein each of the urging portions includes a spring.

5. The developer supply container according to claim 1, further comprising an urging portion provided at each of the opposite lateral sides of the developer supply container, each urging portion being configured to urge the associated seesaw member unidirectionally.

6. The developer supply container according to claim 1, wherein each of the seesaw members includes a plate portion having free end portions, with each seesaw member being rotatable about the second rotational axis, which is positioned between the free end portions.

7. The developer supply container according to claim 1, further comprising a feeding portion configured to feed the developer from the developer accommodating portion toward the discharge opening with rotation of the developer accommodating portion, wherein the feeding portion extends helically on an inner surface of the developer accommodating portion, and wherein the developer accommodating portion and the feeding portion are together rotatable relative to the developer discharging portion.

8. The developer supply container according to claim 7, wherein the feeding portion and the developer accommodating portion are integrally molded.

9. The developer supply container according to claim 1, wherein the developer discharging portion is provided with each seesaw member below a horizontal plane that includes the first rotational axis.

10. The developer supply container according to claim 1, wherein the second rotational axis is positioned between a front end of the developer supply container and the discharge opening in the direction of the first rotational axis.

* * * * *